(12) United States Patent
Meneou, II

(10) Patent No.: US 12,733,625 B2
(45) Date of Patent: Sep. 15, 2026

(54) ANIMAL RESTRAINT DEVICE

(71) Applicant: Ronald Alan Meneou, II, Prescott, AZ (US)

(72) Inventor: Ronald Alan Meneou, II, Prescott, AZ (US)

( * ) Notice: Subject to any disclaimer, the term of this patent is extended or adjusted under 35 U.S.C. 154(b) by 62 days.

(21) Appl. No.: 18/367,409

(22) Filed: Sep. 12, 2023

(65) Prior Publication Data

US 2024/0000042 A1 Jan. 4, 2024

Related U.S. Application Data

(63) Continuation-in-part of application No. 17/182,114, filed on Feb. 22, 2021, now Pat. No. 11,751,538.

(51) Int. Cl.
*A01K 13/00* (2006.01)
*A61D 3/00* (2006.01)

(52) U.S. Cl.
CPC ................ *A01K 13/00* (2013.01); *A61D 3/00* (2013.01); *A61D 2003/003* (2013.01); *A61D 2003/006* (2013.01)

(58) Field of Classification Search
CPC .... A01K 13/00; A61D 3/00; A61D 2003/003; A61D 2003/006
See application file for complete search history.

(56) References Cited

U.S. PATENT DOCUMENTS 266,016 A 10/1882 Cook
866,003 A * 9/1907 Davis ....................... A61D 3/00 119/726
1,235,483 A 7/1917 Johnston
1,487,941 A 3/1924 Hammett
2,773,477 A 12/1956 Michael
2,804,845 A 9/1957 Plumley et al.
2,902,976 A 9/1959 Wilson
2,987,042 A 6/1961 Rothberg
3,023,734 A 3/1962 Schaub
3,120,836 A 2/1964 Brauning
3,208,432 A 9/1965 Fisk
3,266,464 A 8/1966 Davis
3,524,434 A 8/1970 Finley
3,580,222 A 5/1971 Dunn
4,470,372 A 9/1984 Norman
4,644,902 A 2/1987 Doyle
(Continued)

FOREIGN PATENT DOCUMENTS

KR 101813709 B1 12/2017

*Primary Examiner* — Joshua D Huson
*Assistant Examiner* — Edgar Reyes
(74) *Attorney, Agent, or Firm* — Bycer & Marion, PLC; Matthew L. Bycer

(57) ABSTRACT

An animal restraint for dogs that maintains four points of contact to safely, securely, and humanely restrain the dog. The system includes a platform and four poles that can support the animal. The forward poles support a cross shoulder bar which prevents the dog's forward from rising. A belly strap or bar may be used under the belly of the animal to prevent the rear or bending of hind legs. An optional over strap may be used to loop around the animal's rear. The animal's leash may be mounted to the device, preferably at the top and center of the shoulder bar. The device may be adjustable in height and rotation of the poles. The system may be collapsible to allow for storage.

19 Claims, 26 Drawing Sheets

(56) References Cited

U.S. PATENT DOCUMENTS

| | | | | |
|---|---|---|---|---|
| 5,111,770 | A | 5/1992 | Weelink | |
| 5,243,931 | A | 9/1993 | McDonough | |
| 5,960,746 | A | 10/1999 | Salts | |
| 6,058,888 | A | 5/2000 | Nichols | |
| 6,988,467 | B1 | 1/2006 | Smith | |
| 7,007,632 | B1 | 3/2006 | Vrieze et al. | |
| 7,357,099 | B2 | 4/2008 | Smith et al. | |
| 7,603,966 | B1 | 10/2009 | Beebe | |
| 7,806,089 | B2 | 10/2010 | Walker-Indyke et al. | |
| 10,098,325 | B2 | 10/2018 | Monks | |
| 11,751,538 | B2 | 9/2023 | Meneou, II | |
| 2011/0083615 | A1 | 4/2011 | Aaron et al. | |
| 2016/0045294 | A1* | 2/2016 | Sherman | A01K 13/00 119/28.5 |
| 2016/0066541 | A1 | 3/2016 | Storum et al. | |
| 2019/0076228 | A1* | 3/2019 | Kober | A61B 6/0428 |
| 2019/0239482 | A1 | 8/2019 | Peacock Gallagher | |
| 2021/0131623 | A1 | 5/2021 | Scroggins | |
| 2021/0259212 | A1 | 8/2021 | Meneou, II | |

* cited by examiner

ANIMAL RESTRAINT DEVICE

CLAIM OF PRIORITY

The present continuation-in-part application includes subject matter disclosed in and claims priority to U.S. patent application Ser. No. 17/182,114, filed Feb. 22, 2021, entitled "Animal Restraint Device", now U.S. Pat. No. 11,751,538, and also provisional application entitled "Dog Chute" filed Feb. 21, 2020 and assigned Ser. No. 62/979,982, describing inventions made by the present inventor, both herein incorporated by reference.

BACKGROUND OF THE INVENTION

1. Field of the Invention

The present invention relates to animal restraint devices, and more specifically to a device and method of restraining the position of a canine to allow for a caretaker to perform procedures on the canine.

2. Description of Related Prior Art

Dogs, and other animals require restraint at certain times. When a procedure, such as medical, grooming, or otherwise, is to be performed on the animal, the animal may not understand or cooperate fully. For instance, for nail trimming, medical review, anal gland expression, etc. pain or discomfort caused to the animal will cause the animal to respond, fight, or flee. Aggravated or scared animals can pose a danger to care providers through bites, scratches, or physical strain. Therefore, the animal must be restrained.

As a sentient creature, the dog will fight and try to escape confinement. Leashes are often tied to limit the radius of animal movement, often tied above the animal's head. The length of leash serves to limit the three-dimensional radius of movement. A small (raised) platform may prevent lateral movement or escape of the animal, such as a grooming table or veterinarian's examination table. Limits on the and other full body restraints are used for sever procedures, but these restraints can cause pain and suffering to the animal. General sedatives must be used in many procedures to ensure proper access and treatment, as well as the safety of the caregivers.

Such rough treatment to pets is often unacceptable to pet owners, and can be difficult to use. In addition, care can be compounded or needlessly expensive. Equipment may take up space within a small office, and may pose an intimidating feature in a service provider's office.

It is therefore a primary object of the present invention to reduce animal and caregiver injuries.

It is another object of the present invention to limit unwanted human-to-animal contact during procedures.

It is yet another object of the present invention to reduce human resources necessary to restrain an animal during procedures.

It is a further object of the present invention to reduce the use of drugs in order to restrain and provide treatment.

It is also an object of the present invention to reduce fear for the animal and/or human during procedures.

These and other objects of the present invention will become apparent to those skilled in the art as the description thereof proceeds.

SUMMARY OF THE INVENTION

The present invention is directed to an animal restraint device providing for multiple points/types of contacts with the restrained animal (e.g. dog) to comfortably and safely secure the animal. A lower platform or floor is preferably set on (or comprises) a horizontal planar surface. The animal's lower appendages can rest on the platform and engage the weight of the creature. Four poles are preferably coupled to said platform, including two rear poles and two forward poles. The poles are preferably bars that can rotate to vertical, and are preferably mounted to the platform (or to bumpers coupled thereto). The bars may rotate from a nested collapsed position to a vertical (or near vertical) position to implement as restraint in expanded form. The bars may be telescoping in height (with nested inner bar fitted into a lower hollow bar). The inner bar may have height holes to allow a, preferably, spring biased pin to set height of bars. The forward bars are preferably coupled together with a slip jointed cross (shoulder) bar. The rear bars are preferably separate, and can be coupled with a belly strap. The belly strap is preferably coupled to a mounting quick release buckle, such as those used in common car seat belts. Similarly, the belly strap is preferably a nylon strap, such as those commonly used in seat belts. The top of the strap may be provided an over strap mount at one side, and complementarily mated with a fastener towards the tip (or buckle) end of the belly strap. In alternative versions, a belly bar can join rear bars. The belly bar would preferably rotate from a flow forward position back and up under the animal's belly.

A shoulder bar spanning the two forward bars may include a leash mount. Preferably the leash mount includes a dual cam cleat, preferably mounted in center and top of shoulder bar. The cam cleat preferably includes cammed extended ends that face forward to prevent the dog from pull out forward. The leash may be wrapped around the front side of the should bar to also prevent rearward movement of the dog's neck.

The shoulder bar is preferably set horizontal and at the top of the forward bars. The forward bars are preferably set in a vertical position with the height of the shoulder bar set just above the animal's neck, to provide contact with the animal's neck. To limit the dog swinging it head laterally, or ducking, a pair of wings may extend downwardly from the shoulder bar on either/both sides of the center, the animal set int eh center, preferably directly below the leash mount. The rear bars may be set vertically, or for larger animals, an acute angle may be set against rear of device to accommodate larger animals and extend the length of the system (front-back) as between the shoulder bar and the belly strap/bar. A second, or top strap may be used int h rear to set over and secure over the animal's rear to prevent hopping upwards. The second strap preferably mates with the belly strap (under) to form a loop to secure the animals rear end at the belly. Once the belly strap (and over strap) is secured, a tensioner may be used to tighten (and raise the slack, in the belly strap to bring the belly strap up and into place in contact with animal's underbelly.

To collapse the device, the four bars are preferably rotatably mounted on the platform (via bumpers) and can rotate, with the forward bars rotating backwards and the rear bars rotating forwards relative the ground. The animal restraint device as set forth in Claim 1 wherein said four poles are hingedly mounted to said platform allowing rotation of each of said poles relative said platform. The bumpers are preferably set along the side perimeters of the platform. The bars preferably rotate in parallel planes with one another, and may be nested, with the front (or rear) bars mounted at a base wider than the other end. Preferably, bars are mounted to the exterior side of bumpers. In alternative embodiments, the bars may rotate at angled planes relative one another. The orientation of the bars, as they rotate, may be fixed into place with set pins that can lock them in place down, up, and/or at an angle relative the platform. Pins are preferably set into set holes within the bumpers at the preferred angle (e.g., 0 degrees, 90 degrees, 45 degrees, 60 degrees, 85 degrees, 115 degrees, etc.).

The present invention also includes a method for restraining an animal on a device. The animal is placed on the device, preferably by walking forwards onto the rea of the platform. A section of the leash may be set within a leash mount to fix a radius of free leash and restrain the movement of the animal. This may occur before or after a shoulder bar mounted between two forward bars is lowered to the animal's neck or shoulders. If the leash is first mounted, the leash can be tightened in the leash mount to restrict the free rotation of the leash end. The shoulder bar should be locked in place to prevent upward movement of the front of the animal. Leash restricts downward (and forward/backwards) movement. The rear of the animal is secured by preferably wrapping a strap that was hanging from a rear pole, under the animal and coupling the end of the strap with a pole across the animal's body. The coupling may be via a quick release buckle. A tensioner may be provided on the strap (preferably outside the first bar) to tighten the length of the strap and raise the slack up to contact the animal's belly. If the animal is longer than the device, the rear bars may be set at an acute angle to extend the length (forward/back of the device). The bars are preferably locked into position, and the forward bars are preferably vertical (perpendicular plane of platform). A second rear strap may be secured over the animal and fastened along the first (under) strap to create a loop.

To remove the animal from the device, the second rear strap can be decoupled from the under strap. The quick release in the rear can be released to remove the belly strap. The leash can then be released, and the animal can duck under the shoulder bar to walk out. If there is a muzzle or other restraint, they can also be lifted at this time. For storage, the device may be collapsible, with the four poles rotating into the device, to lay flat. The poles/bars may need to be collapsed to reduce the height of each. Securing pins may be used to lock the bars down.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

Figure 1:
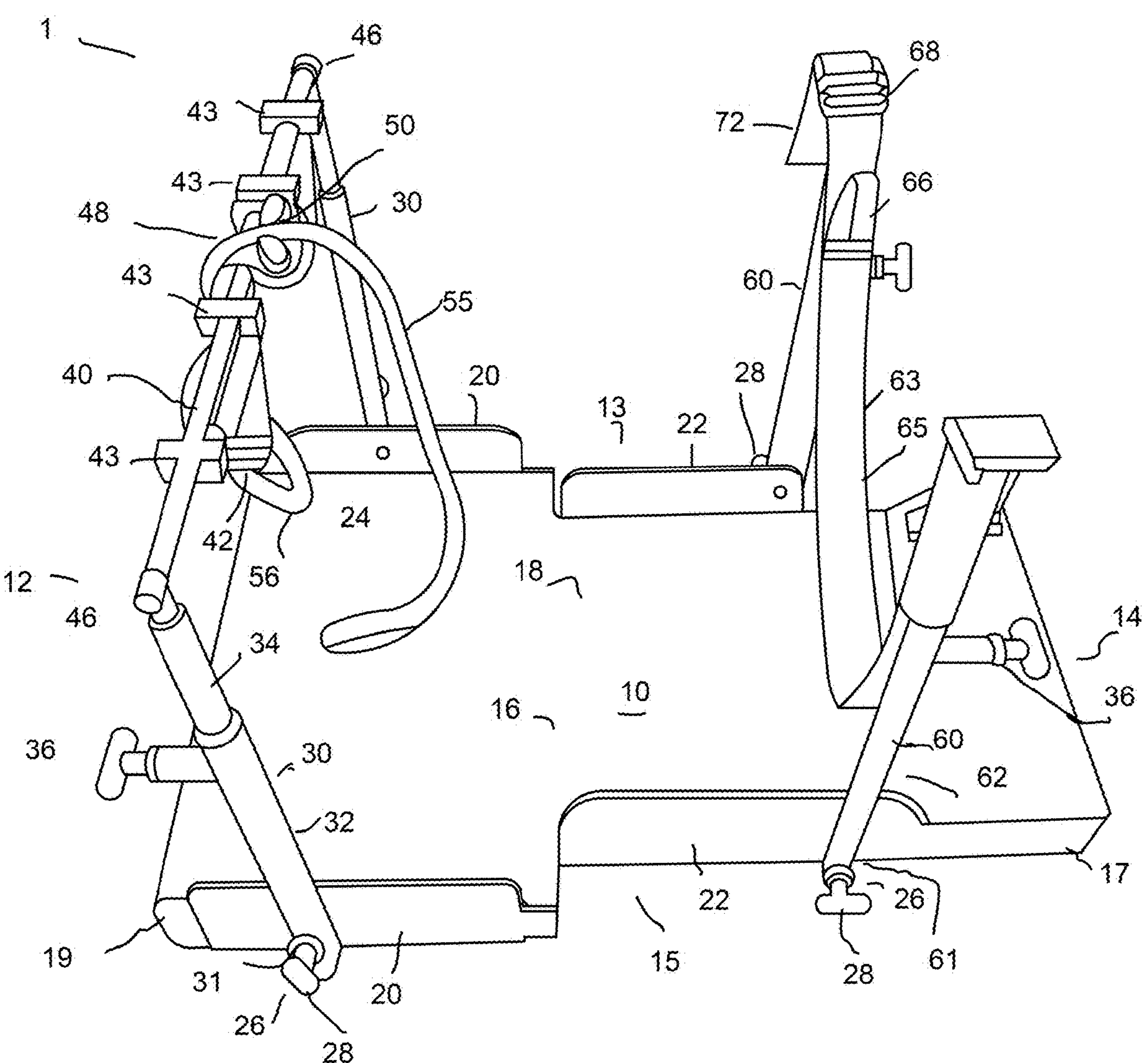
FIG. 1 illustrates a side top perspective view of a dog restraint device of an embodiment of the present invention in extended form.

The dog restraint device is best described as a full body canine restraint device. It is used as an alternative to common human and chemical restraint techniques. To accomplish this, the dog restraint device uses the following preferred four points of contact to the canine:

a) The first point of contact is all four* paws continuously touching the base/platform or floor. This prevents the dog from using leverage with the ground against the device. The ground may provide the bottom, or an artificial floor, if the system is mounted in the ground. The floor may be connected to the device, or otherwise the device may rest on a floor. Floor is preferably planar, horizontal, and flat and connected to device. When the platform floor is connected to the support bars and other components of the dog chute, it prevents the animal from getting leverage against any surface apart from the system. Thus, the animal cannot use any foreign object to create force against the restraint device, but rather must test the strength of the system itself. * Some animals may have less than four lower limbs, and it is anticipated that all of the animals' lower limbs rest on the platform supporting the weight of the animal.

b) The second point of contact is a belly bar or belly strap. An adjustable restraint may be used and raised from below to apply upward pressure to the lower abdomen, cranial of the hind legs. Preferably, belly contact is comfortable and serves to prevent the dog from lowering its abdomen and priming its hind legs to give a power thrust.

c) The third point of contact is a shoulder bar or bumper. A bar may be used and lowered from above to apply pressure to the base of the neck, and/or across the shoulders. This prevents the dog from rearing or raising its cranial side.

d) The fourth point of contact is securing the collar, via the leash mount, using a, preferably spring-loaded, clamp centered on the top of the shoulder bar. The leash mount prevents the dog from tugging downward to release from contact with the shoulder bar or moving forward. The leash is preferably set in front of and on top of shoulder bar, wrapped to prevent the dog from backing up. Together the shoulder bar and leash mount secure the vertical movement of the dog. Further, the leash mount also secures a portion of the leash to define a set radius of the animal relative to the mount in all directions, up, down, left, right, forward, and backward.

The combination of these four points disables the dog from: (1) using the ground to push their way up and out, (2) the ability to lower the hind end or sit, (3) the ability to "rear" up on hind legs or stand, (4) and the ability to move downward, as well as forward (or backward).

e) For the more aggressive dogs, an optional fifth point of contact can be used. An optional fifth point of contact would be reserved for the most severe instances and may include a muzzle surrounding the dog's snout to prevent wide opening of the jaws. Where dogs are prone to bite, or otherwise the caretaker must place items or body parts immediately in front of the animal, a muzzle can prevent bites. A standard muzzle may be integrated with an additional strap laterally on each side of the face that can attach to both sides of the shoulder bar. This would allow for very little movement of the head, which translates to more restraint of the rest of the body. Alternatively, wings may be employed, set lateral and forward the animal's front shoulders/neck to prevent swinging the head or dodging shoulder bar.

Not limited to, but potential materials to be used for system include a lightweight, strong material such as aluminum to be used for the main frame. Preferably, a form-fitted, non-slip, replaceable, rubberized mat floor is set over the platform to provide friction and support to the dog placed thereon.

In some embodiments, the device includes bars that run laterally across the dog's body. The bars may be raised vertically, may be positionally horizontally. In an alternative embodiment, the bars are rotated upwards from a set of parallel horizontal transverse vertexes along a lower frame to reach preferred positions, lock there, to accommodate differing sizes of dogs, or other animals or items that are to be secured. The bars can be telescoped to modify the size thereof to accommodate differing sized dogs.

In preferred embodiments, bars (top and lower) are preferably either mounted to the base or floor, or to vertical bars. The bars may be connected to vertices, or on racks, or as otherwise known in the art. The vertexes, or joints, or otherwise, may be coupled to vertical poles (bars), etc. that can be moved relative one another. For instance, telescoping longitudinal base bars may be used to connect vertically aligned poles (bars attached thereto preferably via rotating arm—arm meeting pole at vertex), the vertical poles can be moved closer/further from one another to accommodate differing sizes of dogs. In this way, the "vertical" rear pole is not set literally vertical.

As shown in FIGS. 1-15, dog restraint 1 is sized and shaped for a myriad of animals, preferably canines between ten and one hundred-fifty pounds. Smaller sizes may be useful with tiny dogs or other small creatures weighing below ten pounds. A larger device may be employed for cattle or other large animals exceeding two hundred pounds. Restraint 1 includes platform 10 serving as a base plate or bottom bearing the weight of remaining features on dog restraint 1. Platform 10 is preferably set upon a flat horizontal planar surface, such as a veterinarian's floor. Platform does not need to be secured against the floor as the dog restraint device should be internally stable. Platform 10 includes forward, or cranial, side 12 and rear, or caudal, side 14. Platform 10 includes top surface 16 upon which the animal may rest. Top surface 16 may be set with a texture for removable mat 18 that provides for a non-slip surface. Mat 18 is preferably a rubber mat with grooves or pattern that is waterproof, including crevices or channels to allow for washing down of any fluids. Mat 18 may be removable from the top surface and is preferably sized and shaped to fit platform 10. It is contemplated that all paws, or feet, of the animal should be secured on top surface 16.

Platform 10 includes right side 13 and left side 15. Forward bumpers 20 are set along the right and left side of cranial portion of platform, while rear bumpers 22 are set along rear or caudal side of platform. Platform includes rear overhang 17 behind rear vertical bars 60 to provide space for animal to enter device from rear behind rear vertical bar vertices 61. Forward end 12 may also include an overhang 19 to accommodate larger animals. Forward and rear bumpers, 20 and 22 respectively, include vertices 31 and 61 respectively, wherein forward vertical bars 30 are hingedly mounted onto forward vertices 31, and rear vertical bars 60 are mounted at rear vertices 61. While the term "vertical" is used to reference the bars, the hinged and rotating nature of the bars may place the bars outside of a vertical position. When in extended position, as shown in FIG. 1, bars may be vertical, or slightly off vertical, depending on the size of the animal so restrained. For instance, if a very large animal is to be restrained, rear bars 60 may be set at an angle, acute 80 relative to rear 14 (obtuse 82 relative the front), to extend the length between forward and rear engagement with animal. Bumpers include set holes 24 that can accommodate preferably spring-loaded locking pins 26 in the lower half of each of the bars. Pin handles 28 preferably provide for a twist lock mechanism to allow pins to be retracted from holes 24 as the handles are pulled horizontally away from bumpers. As locking pins are set back through pin holes 28, the raised position of vertical bars may be set.

Each of vertical bars is preferably of a telescoping nature. Each bar, both forward bars 30 and rear bars 60, include a lower bar, 32 and 62, and higher bar, 34 and 64. Higher bars 34 and 64 may include height holes 35 whereby telescoping handles 36 allow for a locking pin to be removed and replaced into height holes 35 to adjust and fix the height of each of the bars.

A horizontal shoulder bar 40 is preferably set upon top ends of vertical bars 30 connecting right and left side. Corners 46 are preferably slip joint corners that allow for stepwise adjustment of height of bars 30 while maintaining contact with shoulder bar 40. In this way, each of the vertical bars can be adjusted independently, while shoulder bar remains coupled thereto. Shoulder bar 40 includes wing mounts 43 with descending loops as wings 42. Preferably, wings are made of a rigid material and serve as physical blockers to prevent movement of animal's head left and right when secured to dog restraint device. Wings 42 include wing loop 45, each with a wing bottom 44 serving as the lowest, or minimum, location of the wing. It is preferred that wings extend low enough to prevent ducking or swooping of animal's neck. Preferably centered on shoulder bar 40, is leash mount 48. Dual cam cleats 50 allow for a leash 55 to be set and secured thereon. Orientation of cam cleats 50 prevents forward motion of leash and thereby prevent animal from pulling down against shoulder bar 40. Preferably, leash 55 is set forward of shoulder bar from cam cleats 50. Leash may be wrapped forward of shoulder bar and down to mate with a dog collar 58. In this way the bar and leash mount not only prevent forward motion, but downward and rear motion of the animal. Leash handle 56 allows for preferential tightening of leash as may be necessary to secure animal in place. Opposite end of leash may include collar 58, either integral with leash, or a coupler set on the leash to couple with a dog's pre-existing collar. Given the nature of cam cleats, a simple reverse direction, pulling backwards and up, will release leash from cam cleats.

Rear bars 60 are set with a removable belly strap 63. Belly strap 63 is preferably fixed to tensioner 68 at right rear bar 60A, with slack end 72 extending from tensioner. Belly strap 63 may be affixed to a quick release buckle 70 set along rear bar 60B to allow strap to couple between rear bars and hang therefrom. Utilizing tensioner, belly strap may be pulled tightly and up snugly against animal. Top strap 66 is affixed near rear bar 60A onto belly strap. Top strap 66 may set into a fastener 74 on lower strap 65, preferably a hook-and-loop fastener to fix over animal's rear end.

Figure 2:
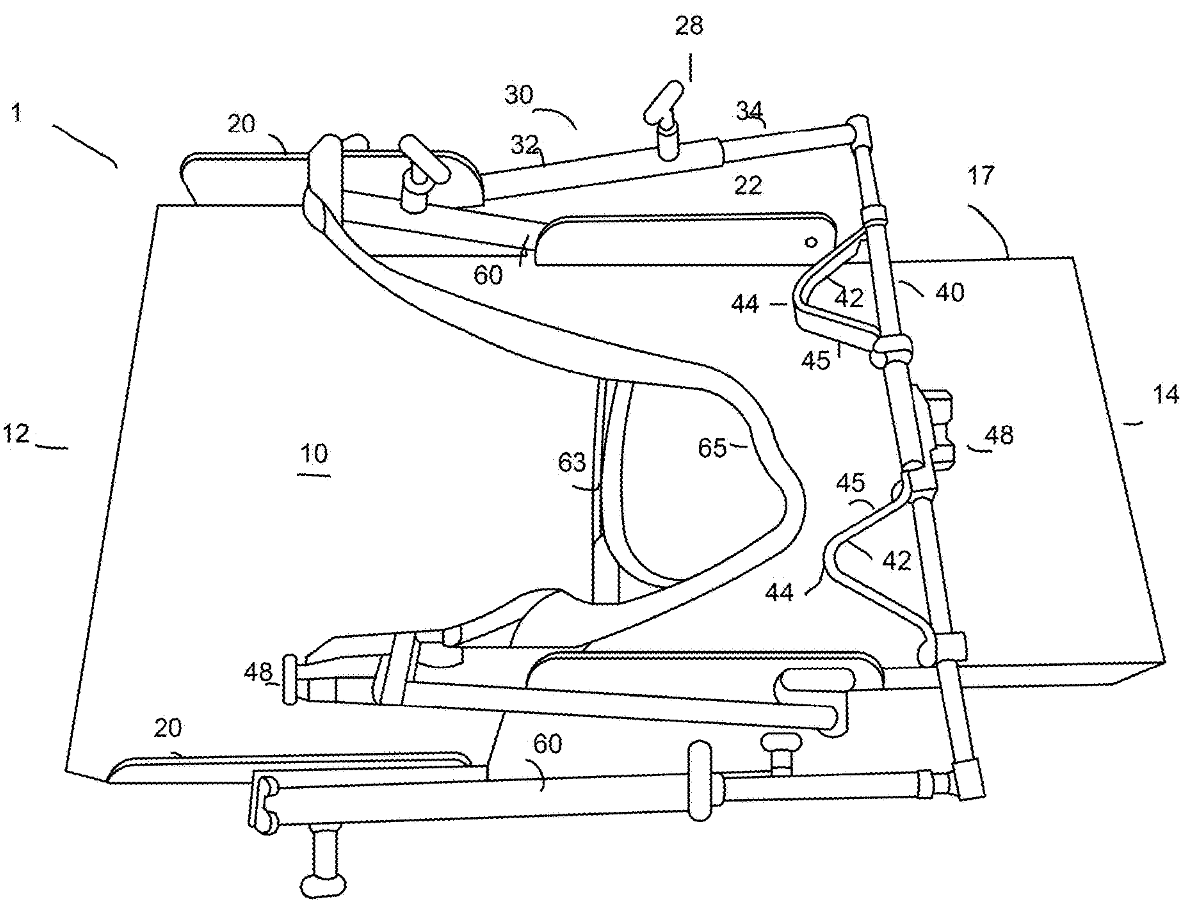
FIG. 2 illustrates a side top perspective view of a dog restraint device of an embodiment of the present invention in collapsed form.
Figure 3:
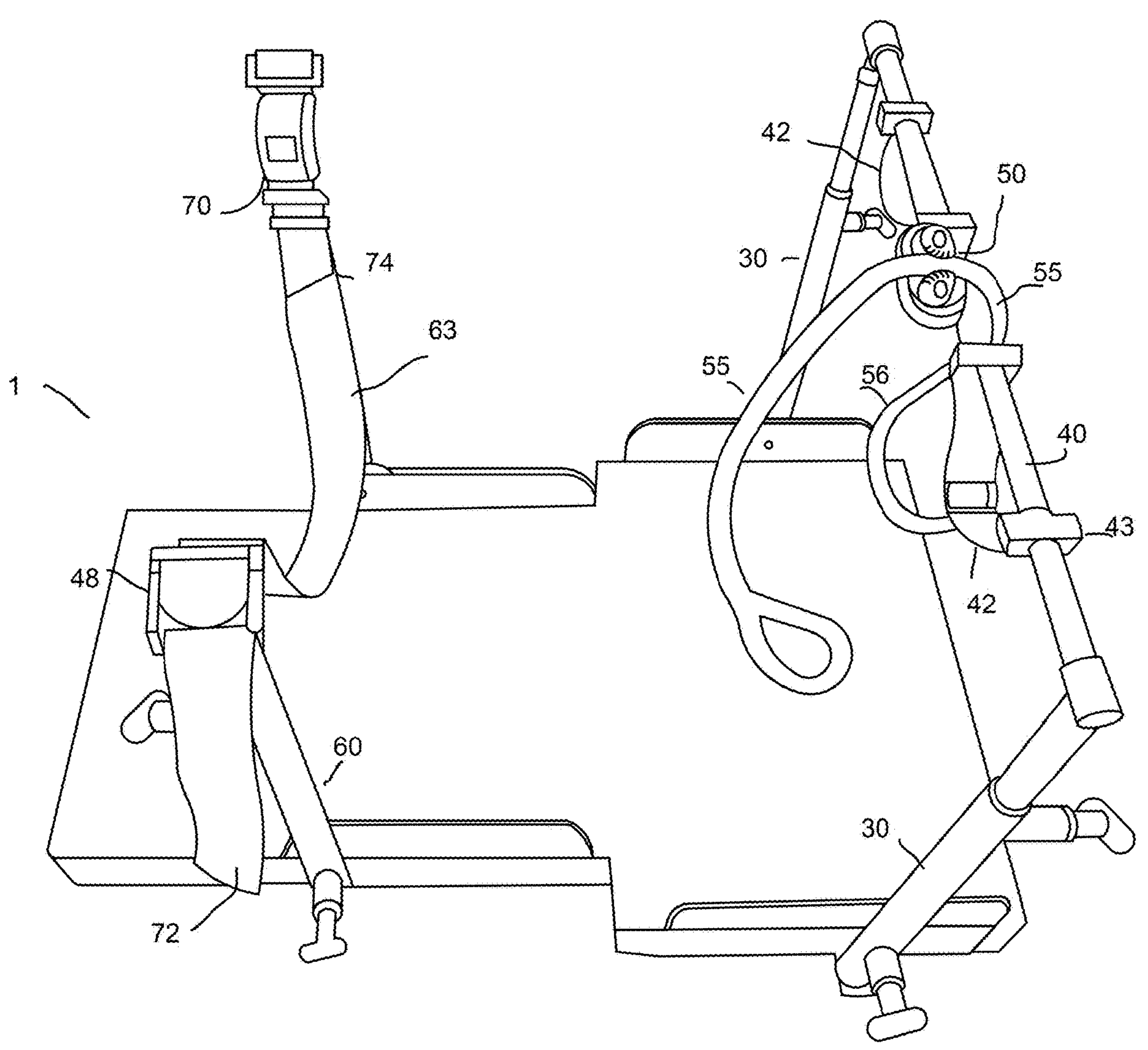
FIG. 3 illustrates an opposite side top perspective view of the dog restraint device as shown in FIG. 1.
Figure 4:
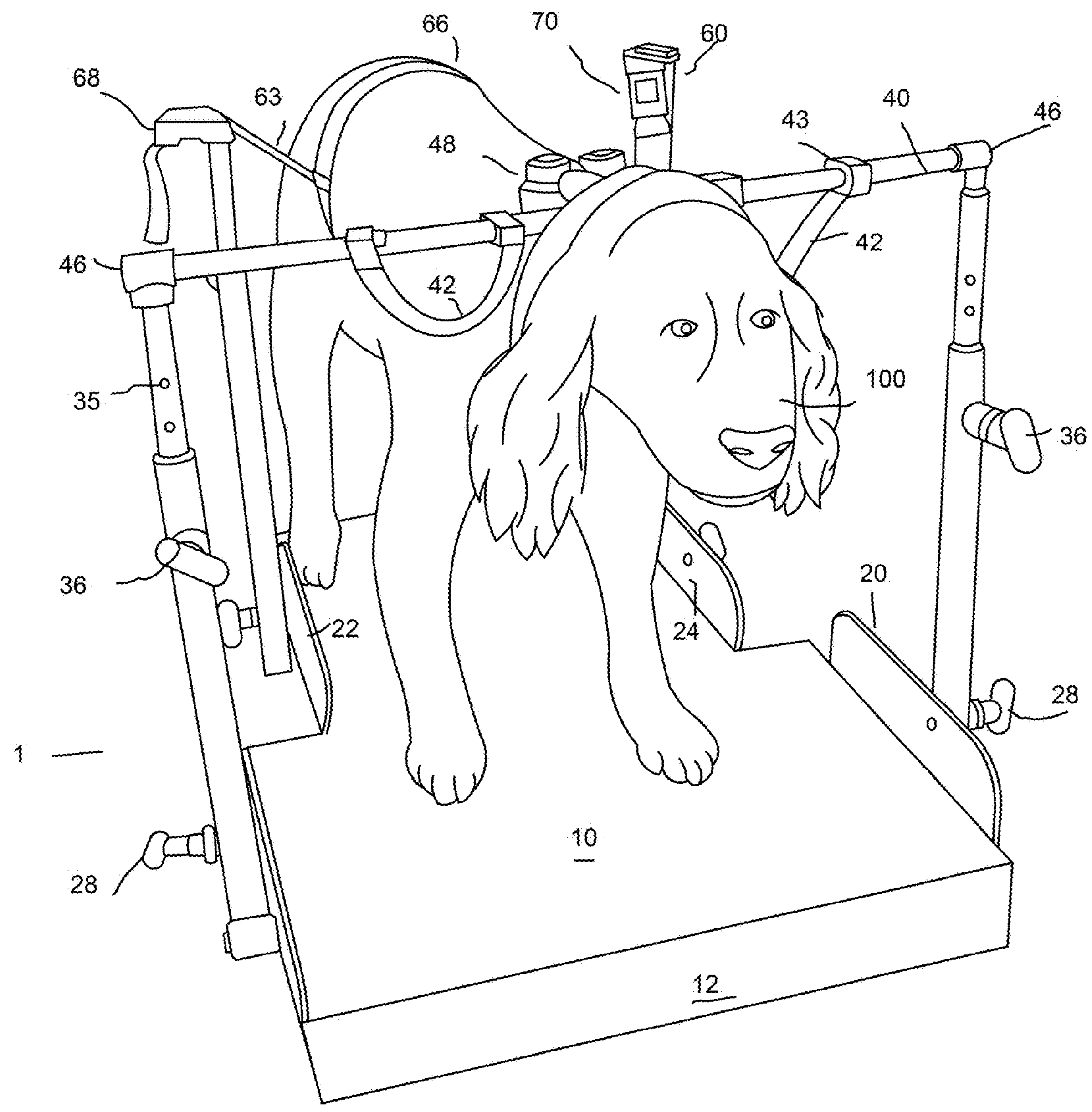
FIG. 4 illustrates a front perspective view of a dog restraint device with dog secured thereon.
Figure 5:
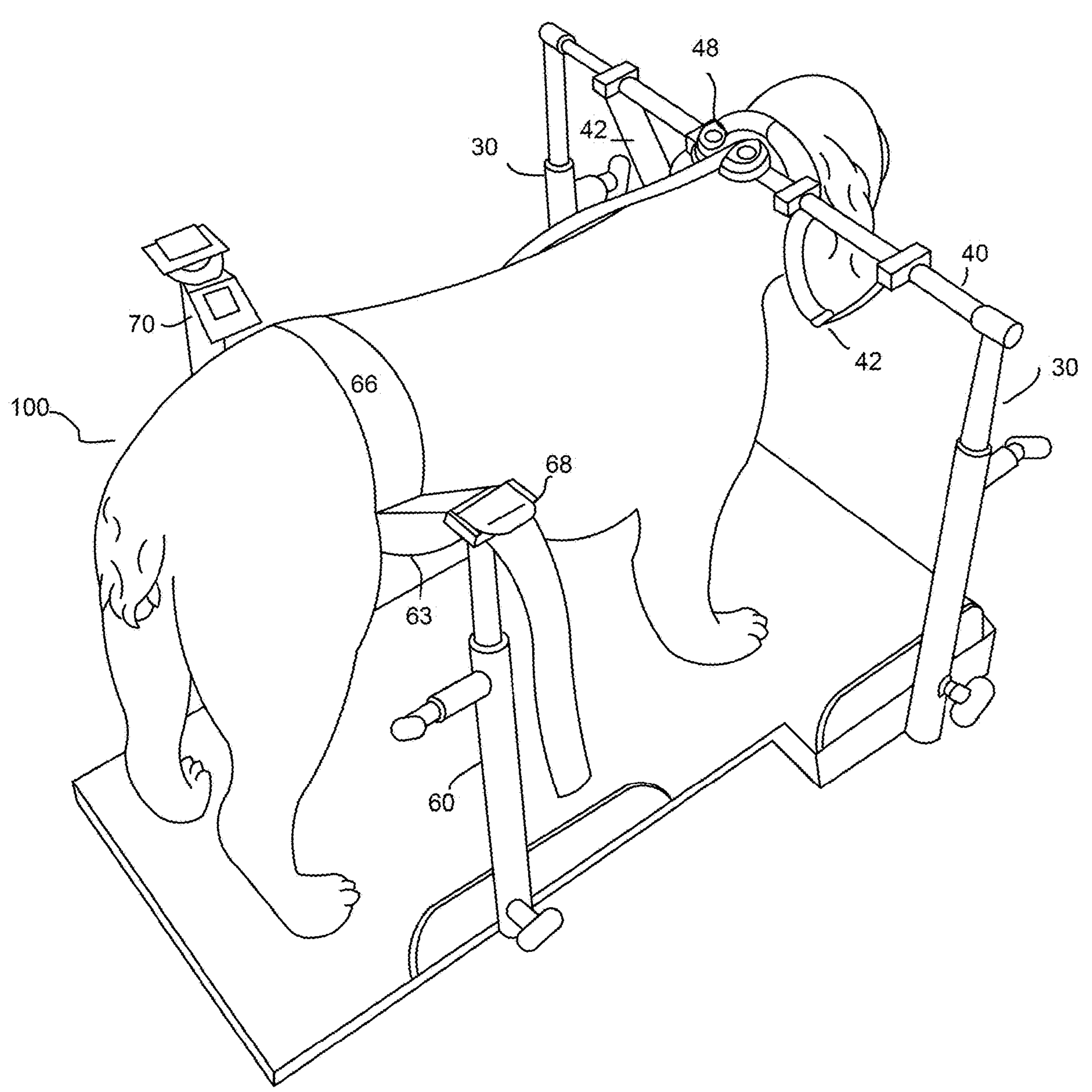
FIG. 5 illustrates a rear top perspective view of the dog restraint device with dog secured thereon.
Figure 6:
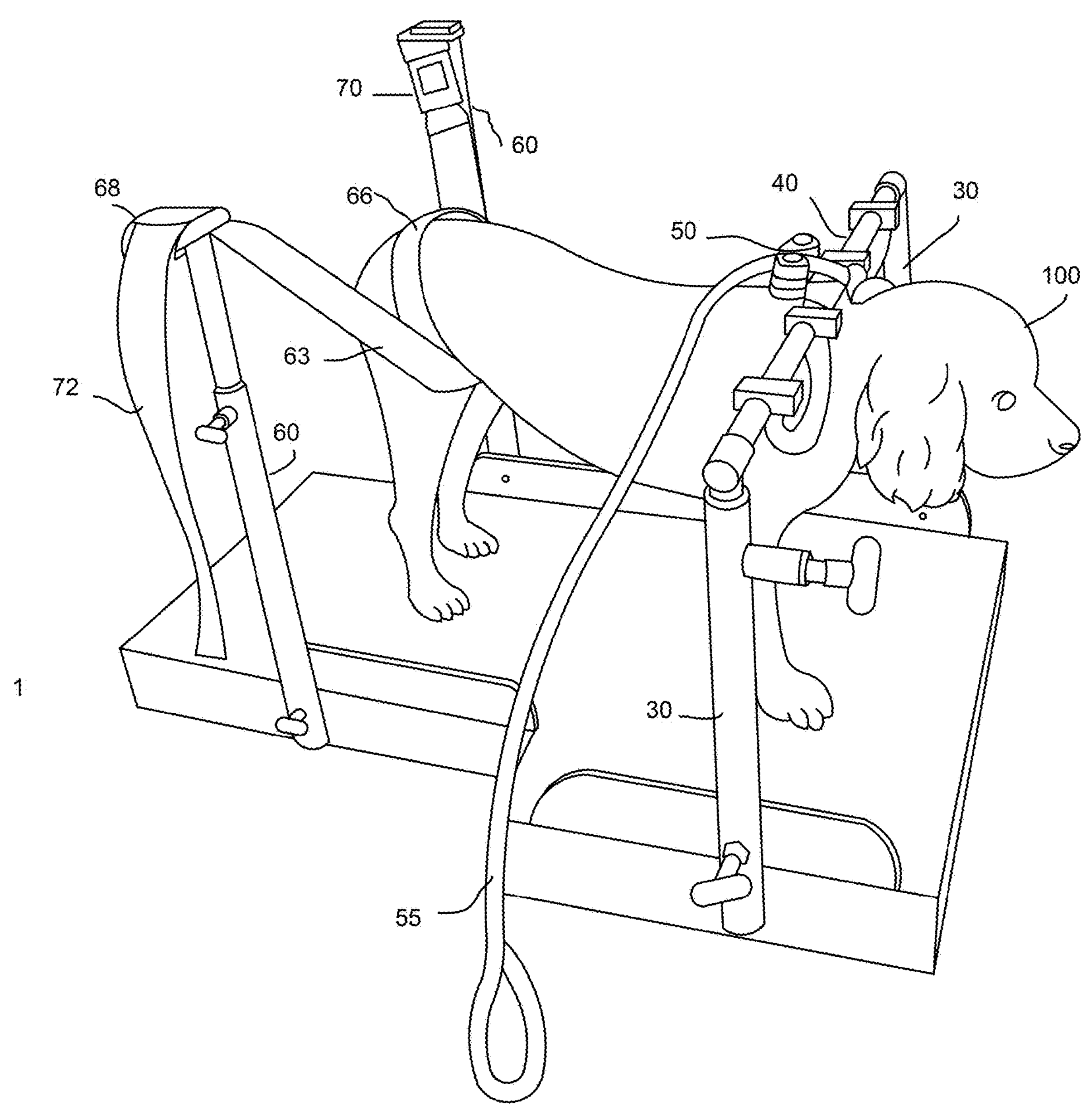
FIG. 6 illustrates a top side perspective view of the dog restraint device with dog secured thereon.
Figure 7:
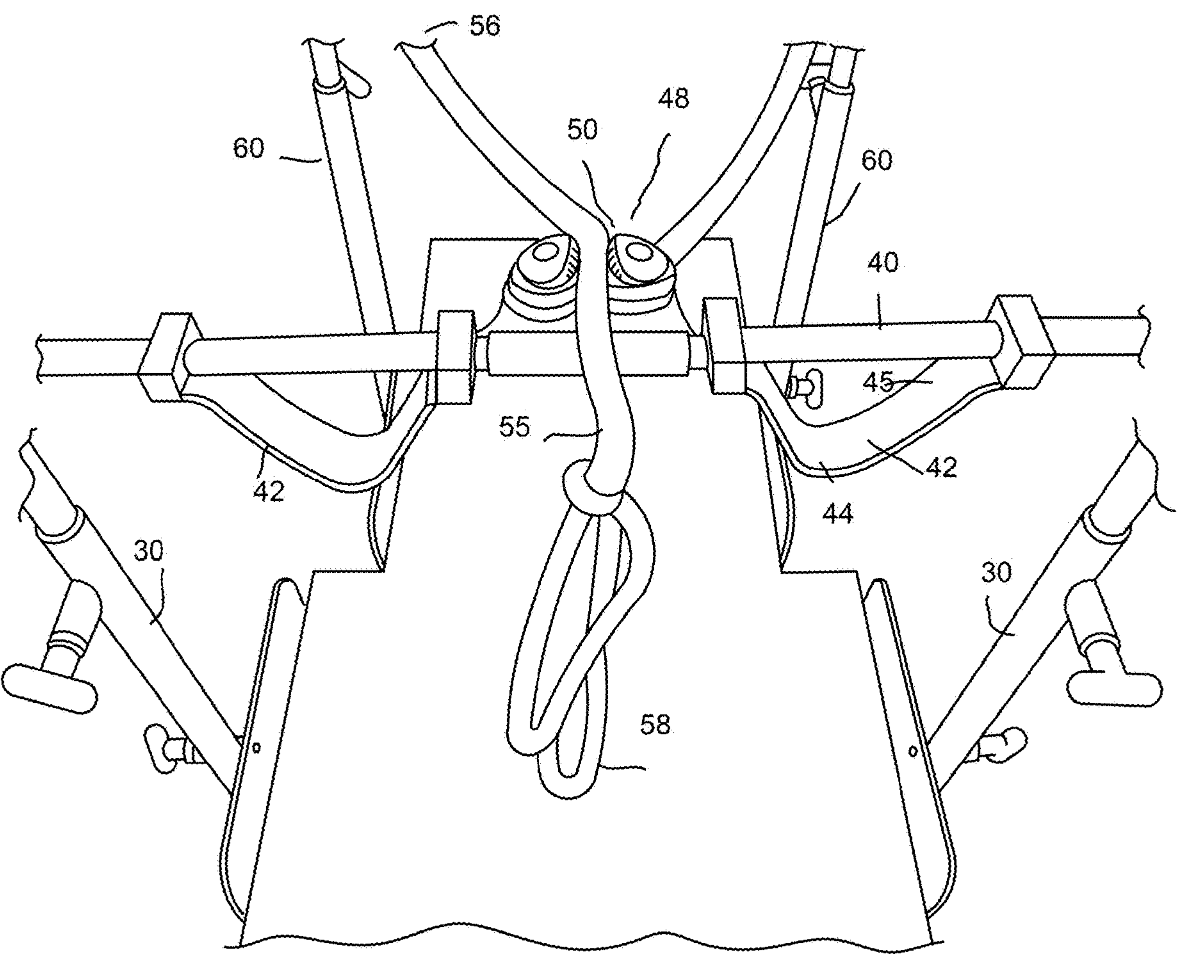
FIG. 7 illustrates a magnified top front perspective view of a central portion of dog restraint device of an embodiment of the present invention.
Figure 8:
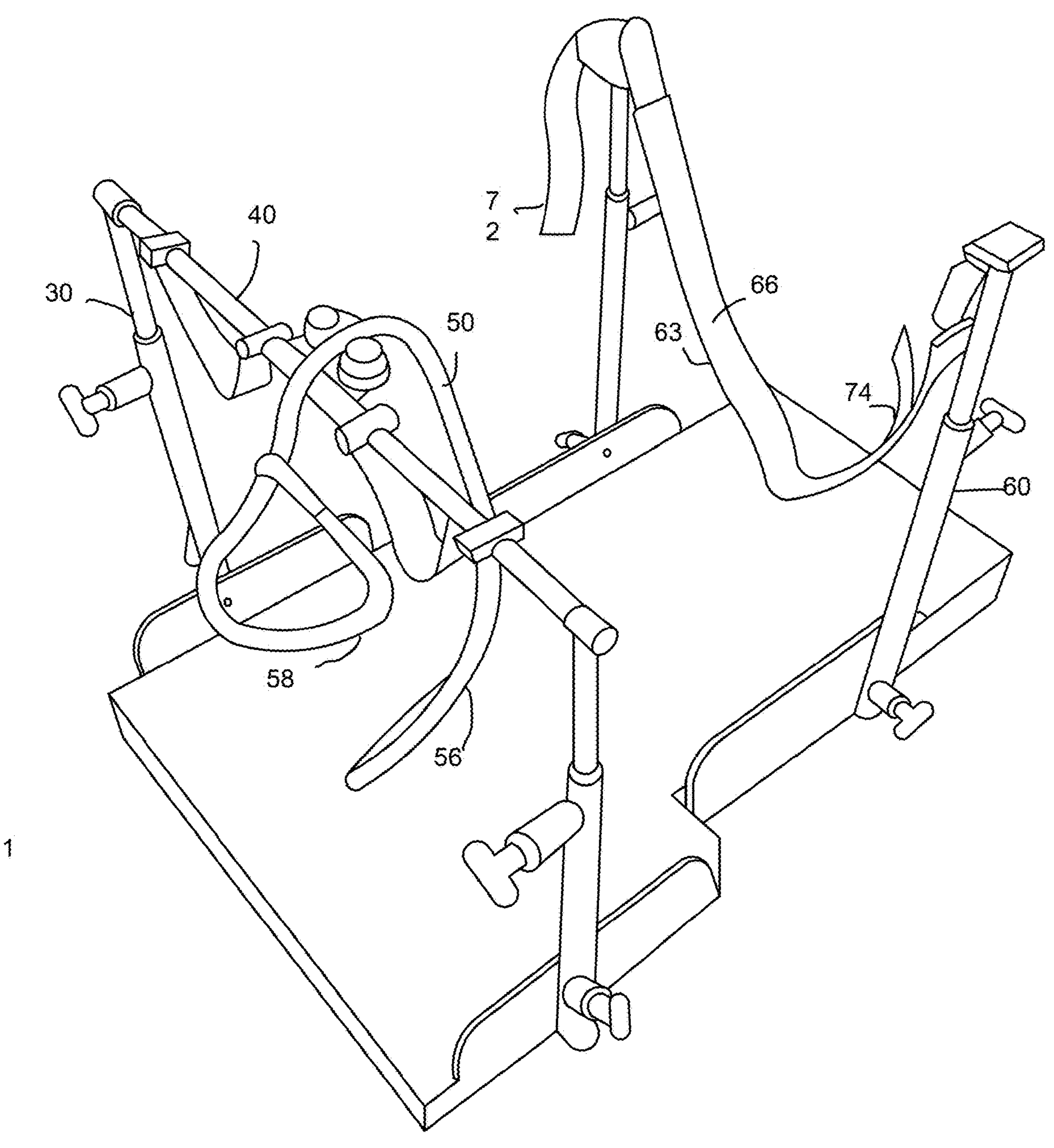
FIG. 8 illustrates a perspective view of a dog restraint device in extended form.
Figure 9:
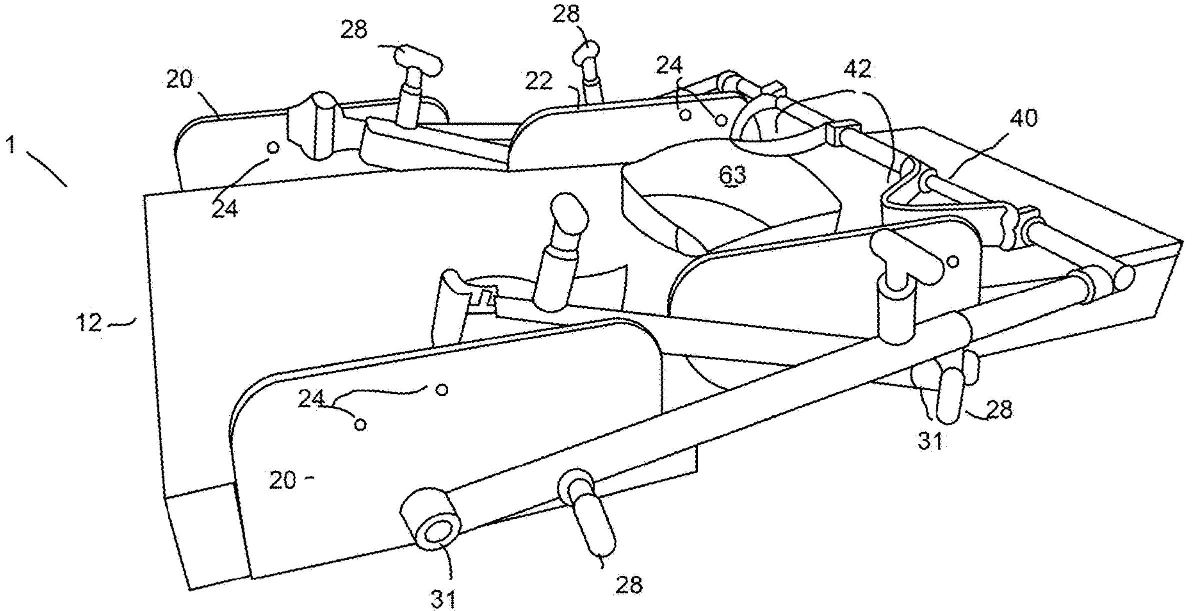
FIG. 9 illustrates a side perspective view of a dog restraint device in collapsed form.
Figure 10:
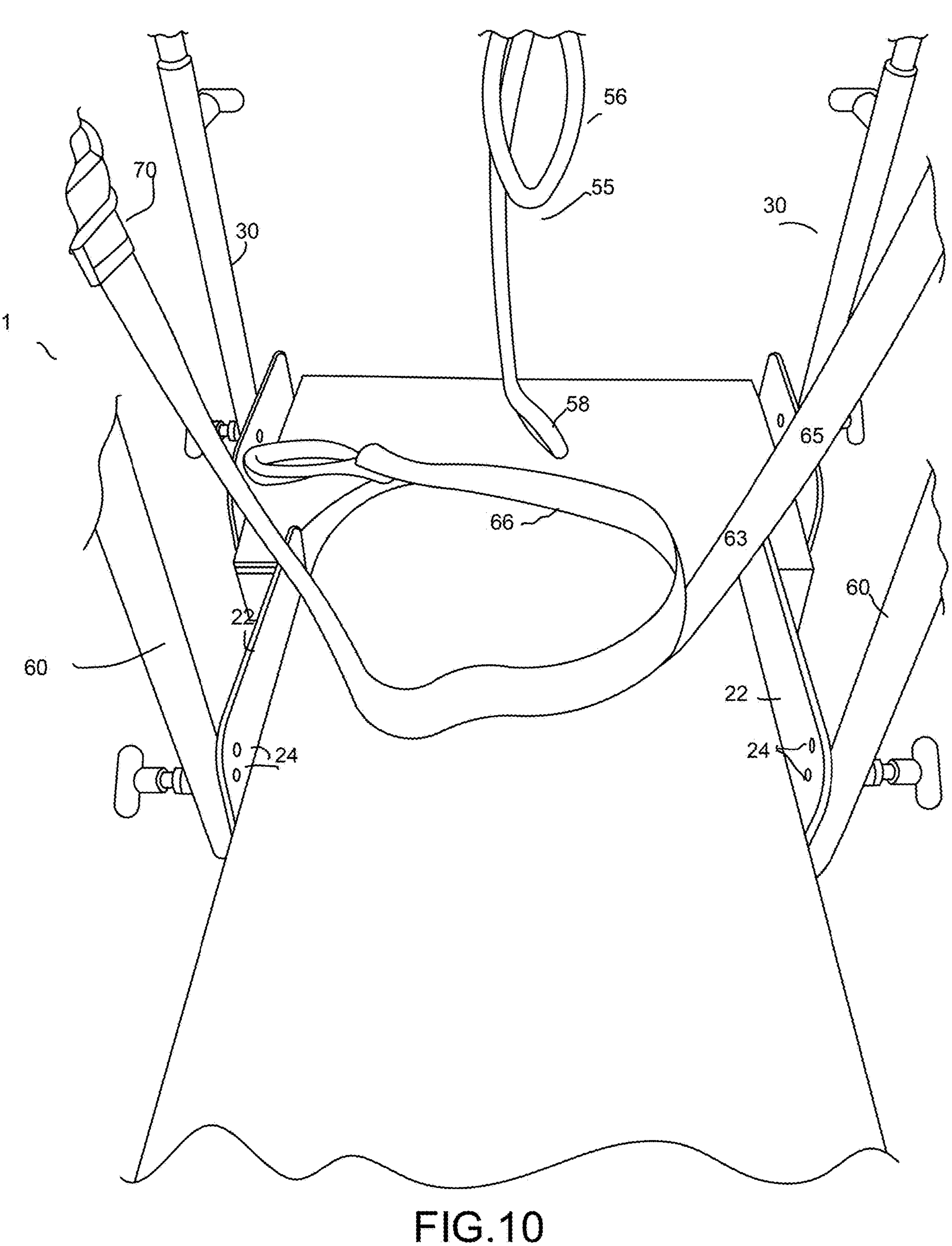
FIG. 10 illustrates a magnified rear top view of a dog restraint device in extended form.
Figure 11:
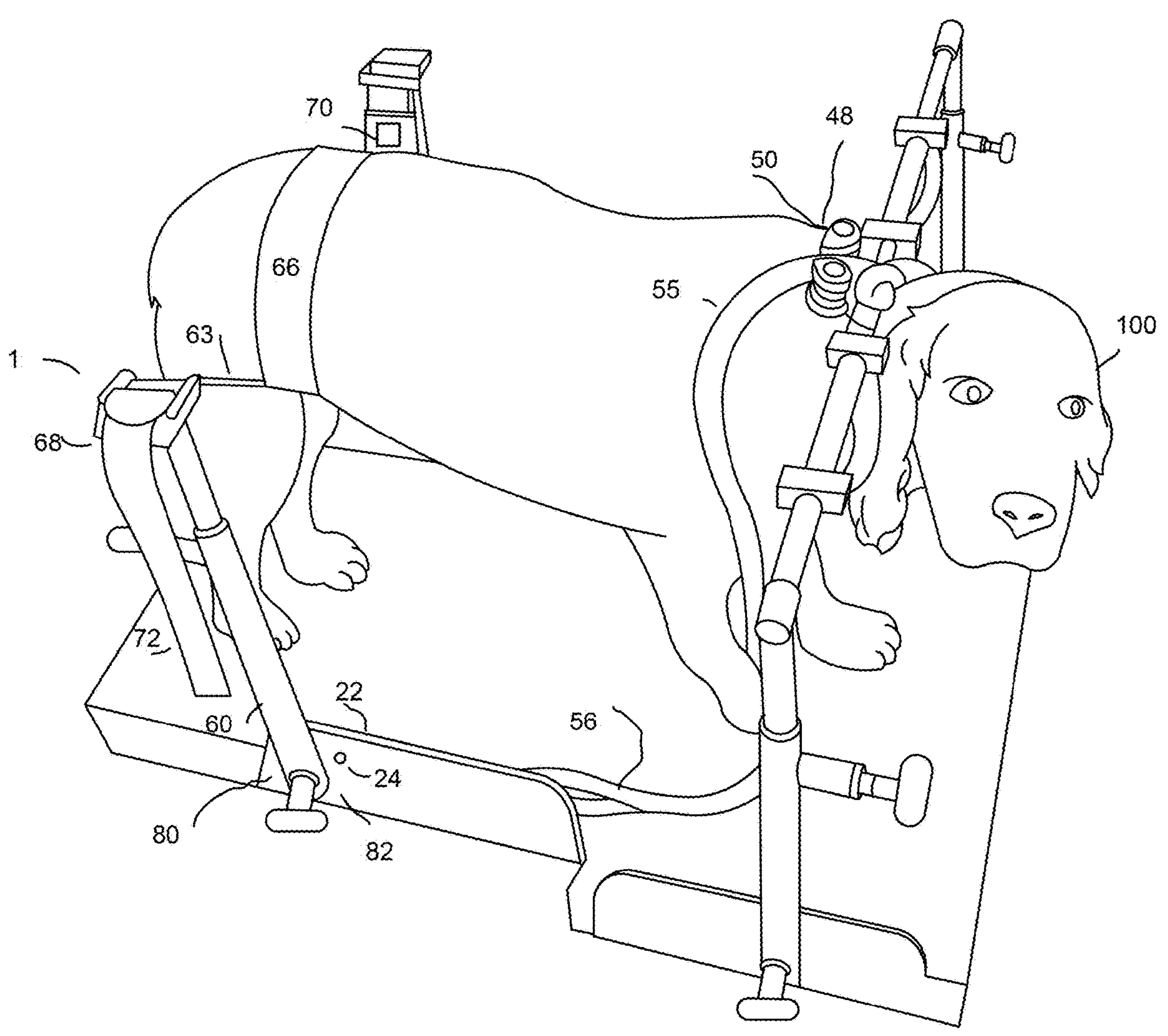
FIG. 11 illustrates a perspective view of a dog restraint device with animal secured thereon.
Figure 12:
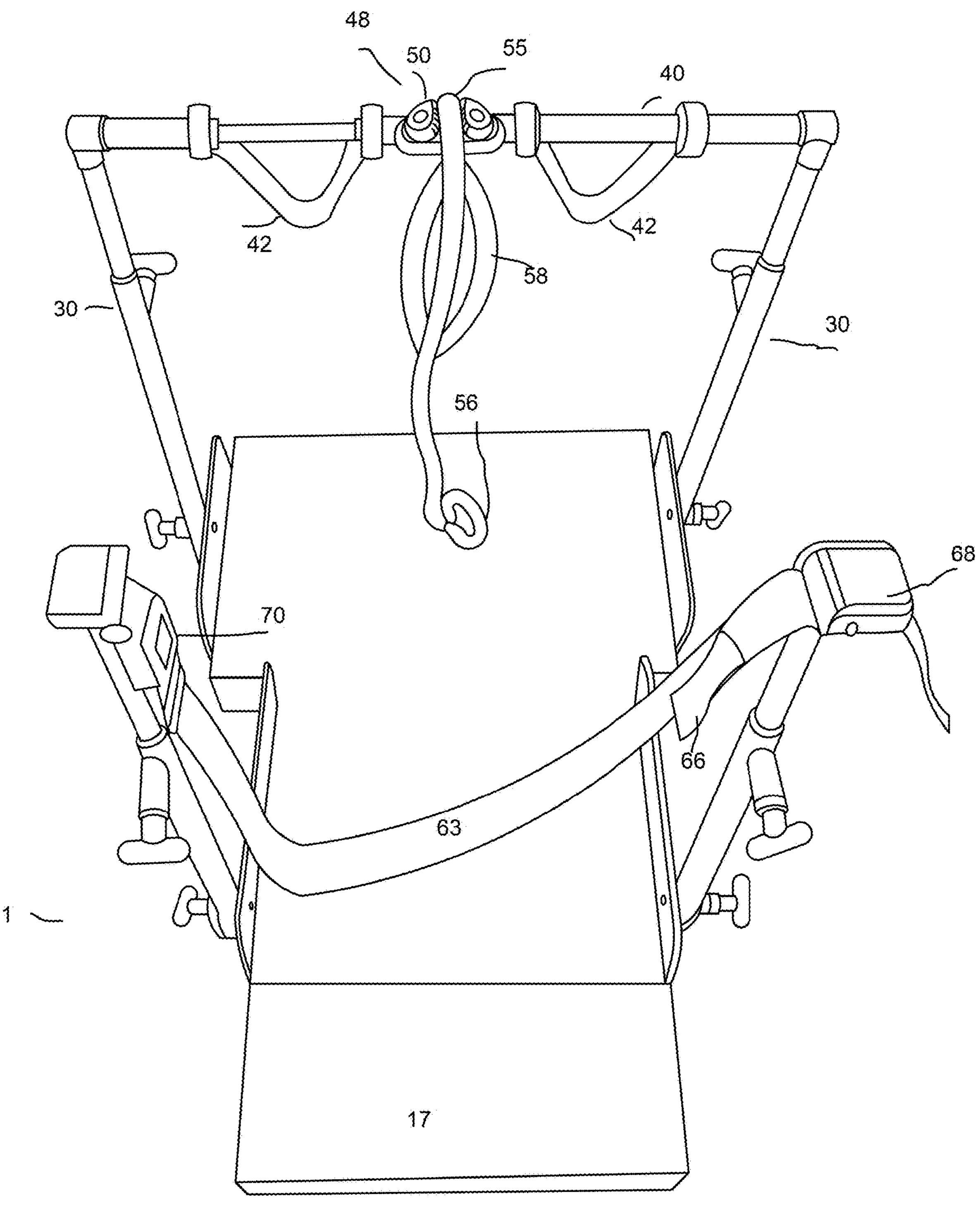
FIG. 12 illustrates a top rear perspective view of a dog restraint device of the present invention in extended form.
Figure 13:
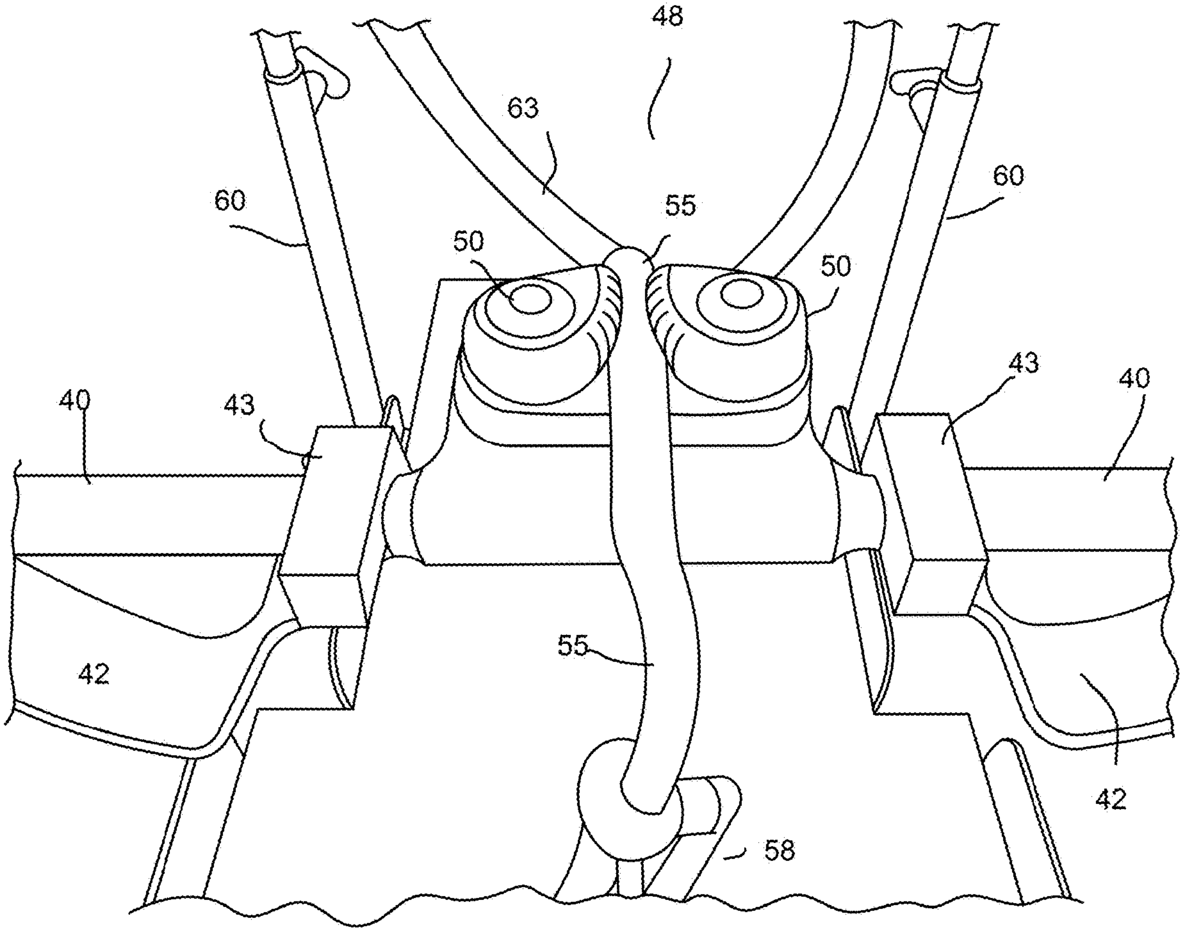
FIG. 13 illustrates a magnified view of dog restraint device of an embodiment of the present invention.
Figure 14:
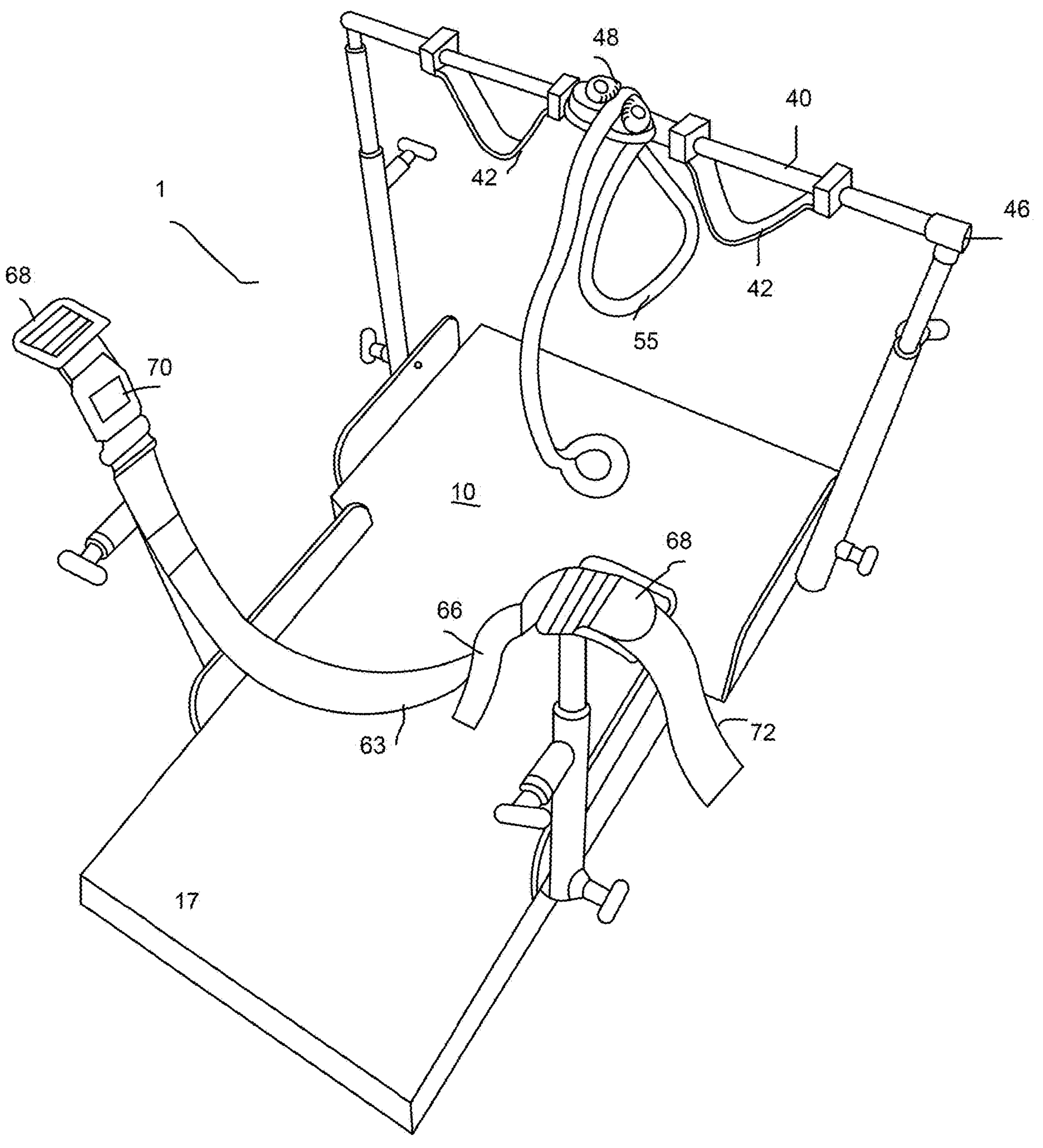
FIG. 14 illustrates a rear perspective view of an extended dog restraint device of an embodiment of the present invention.

As shown in FIG. 2, dog restraint 1 may be set into a collapsed form. Locking pins 26 may be pulled out from bumper holes 24 via pin handles 28 to decouple bars 30 and 60 from bumpers 20 and 22 respectively. Preferably pin handles can be twist-locked in place at both forward and rear poles, the pins set in place into poles being biased by a spring pushing pin inwardly, and handle actuates a twist lock securing pin to compress spring and lock pin outwardly. Bars 30 and 60 may thereby be rotated downward at vertices 31 and 61 to allow vertices to act as hinges and bars to collapse. Platform 10 includes forward 12 that is preferably wider than rear 14. By offsetting the width of forward and rear bumpers, and forward and rear vertices, bars may nestedly fold as shown in FIG. 2.

As shown in FIGS. 4-6 and FIG. 11, an animal, such as a dog 100, may be secured on dog restraint device. The height of the bars is preferably set above the height of the dog to allow comfort in the shoulder bar rest and cause the belly straps to ride up on either side.

Figure 15:
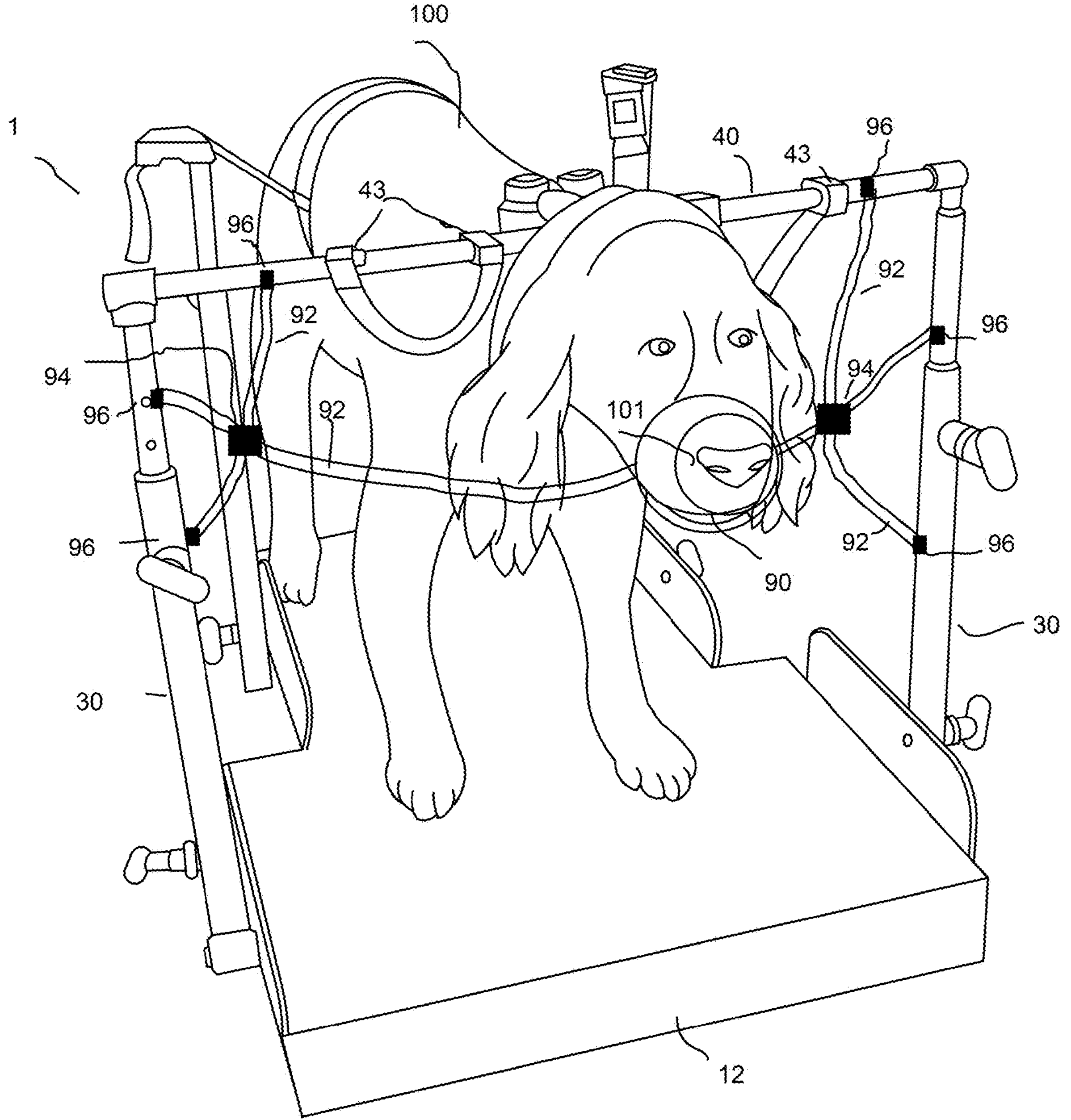
FIG. 15 illustrates a front perspective view of a dog restraint device with dog secured via muzzle thereon.
Figure 16:
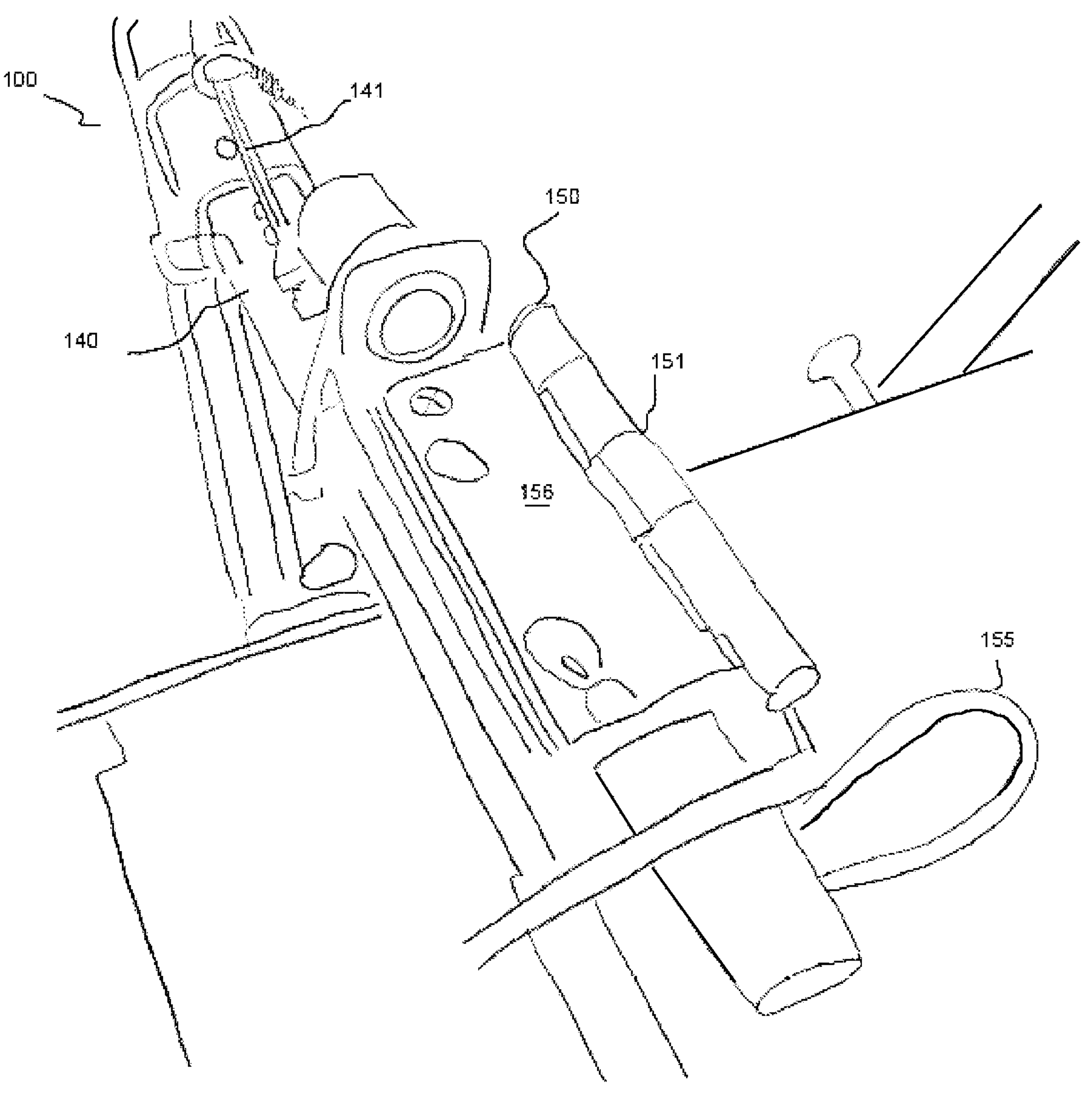
FIG. 16 illustrates a magnified top perspective view of dog restraint device of an embodiment of the present invention.
Figure 17:
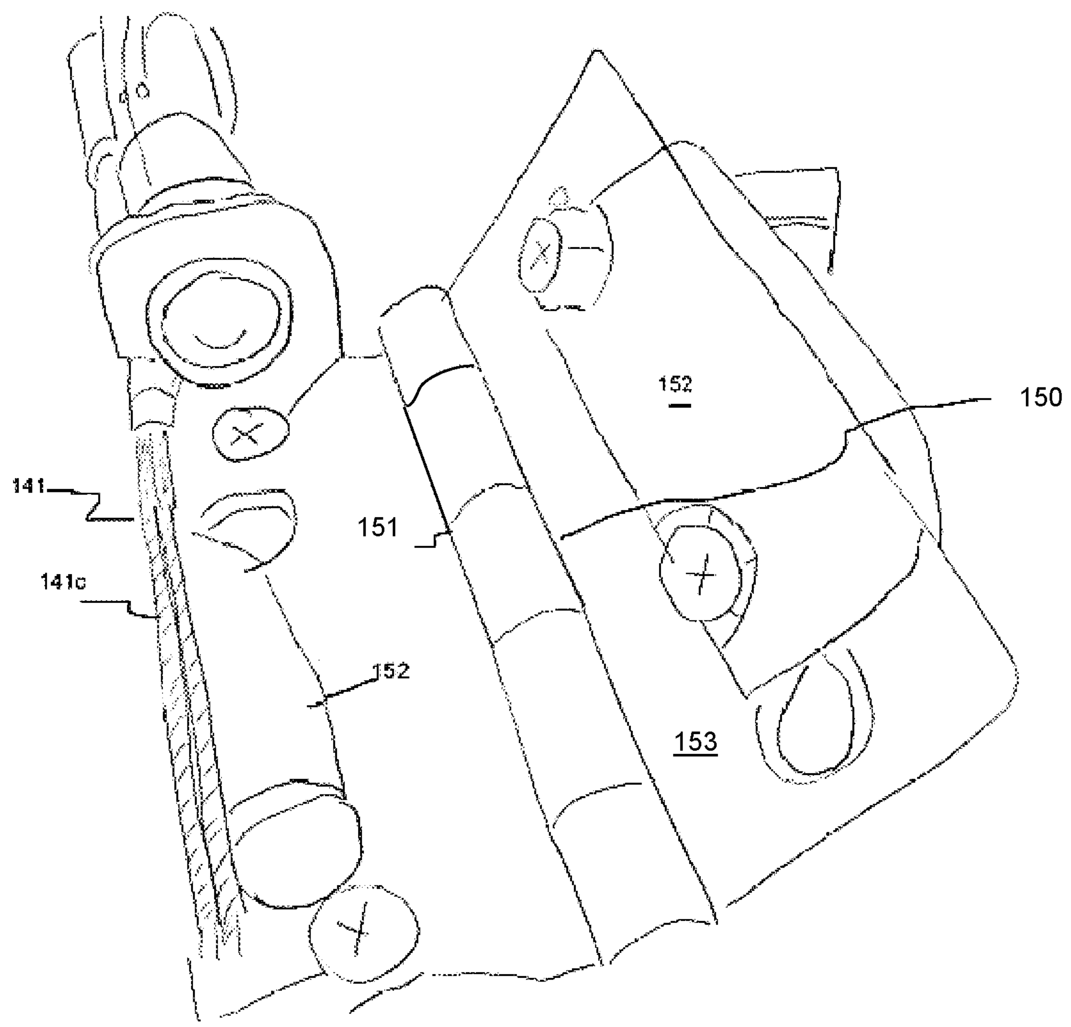
FIG. 17 illustrates a magnified top perspective view of dog restraint device of an alternative embodiment of the present invention.

In alternative embodiments, where a muzzle 90 may be used are shown in FIG. 15. Muzzle 90 may be mounted via preferably removable attachments 96 to forward bars 30 and shoulder bar 40. Attachments 96 may utilize preexisting holes (for instance wings may be removable and wing mounts 43 may be used, or otherwise attachments may be mounted to the bars. Rope 92 secures the position of muzzle 90 as it is paced around animal 100 snout 101. Adjustable, preferably cam, cleat 94 may help adjust the orientation and position of the muzzle.

Figure 18:
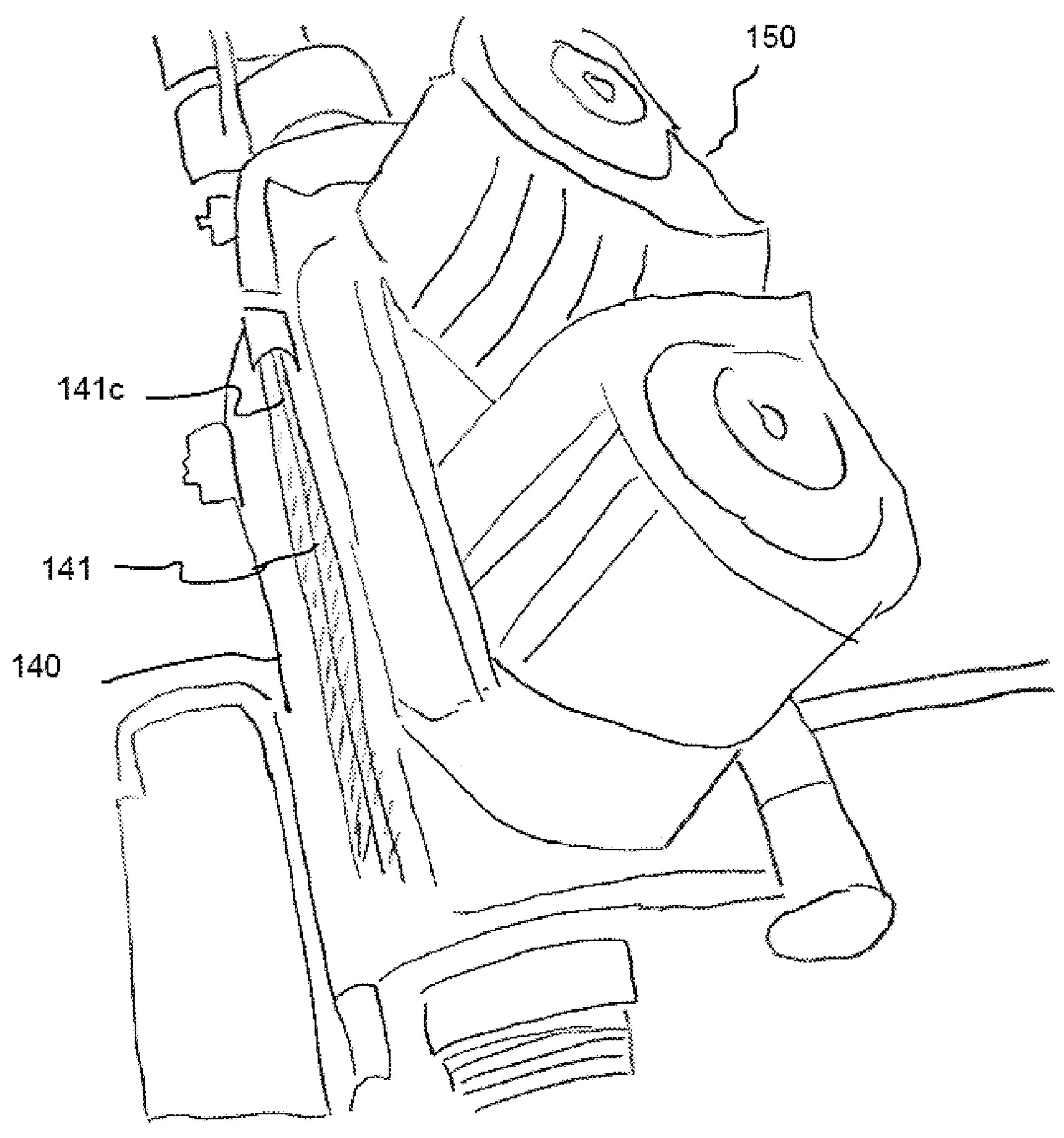
FIG. 18 illustrates a further magnified top perspective view of dog restraint device of an alternative embodiment of the present invention.
Figure 19:
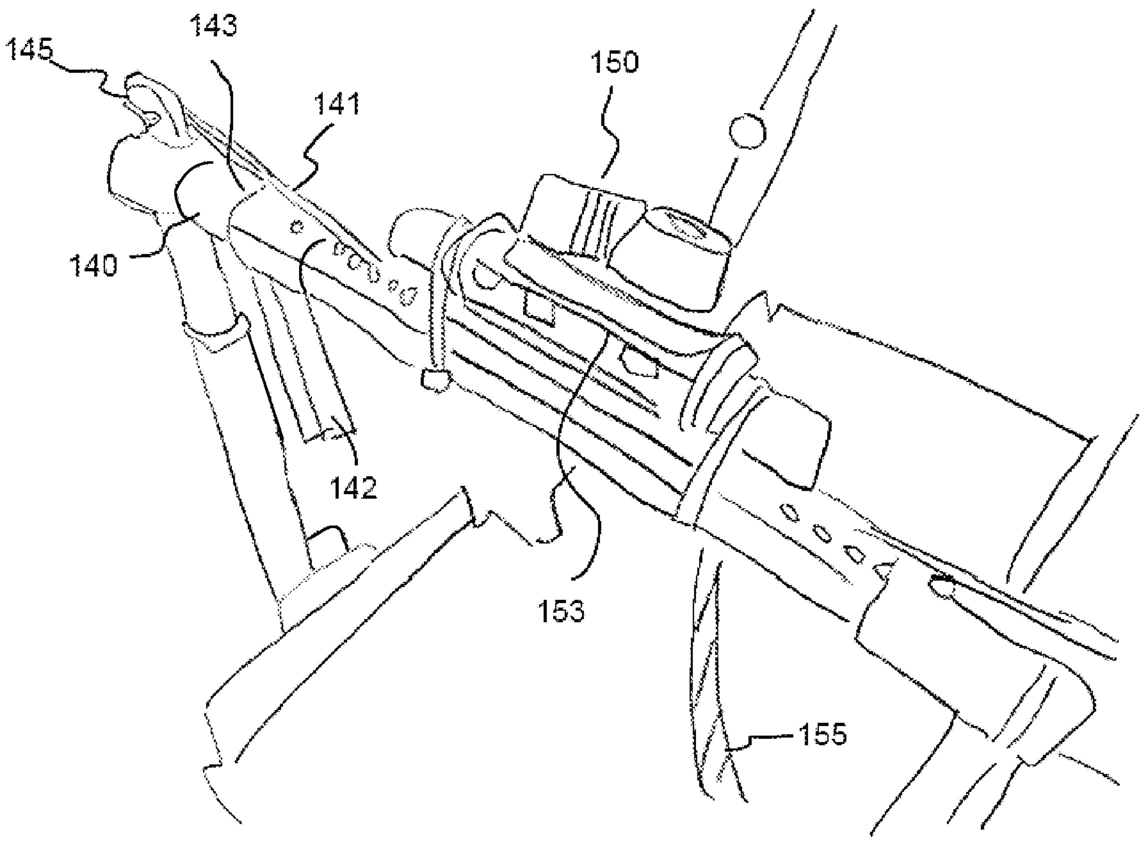
FIG. 19 illustrates a magnified top perspective view of dog restraint device of an alternative embodiment of the present invention.
Figure 20:
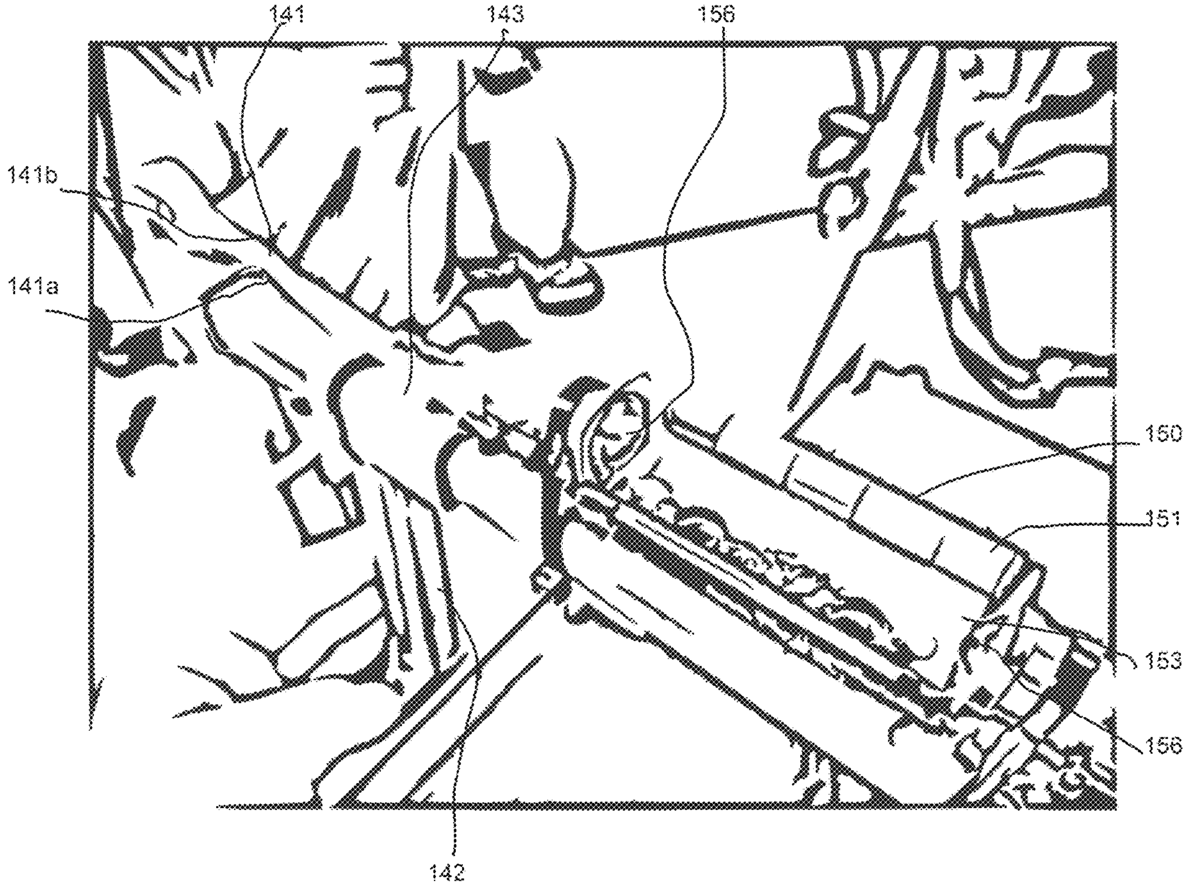
FIG. 20 illustrates a magnified top perspective view of dog restraint device of an embodiment of the present invention.
Figure 21:
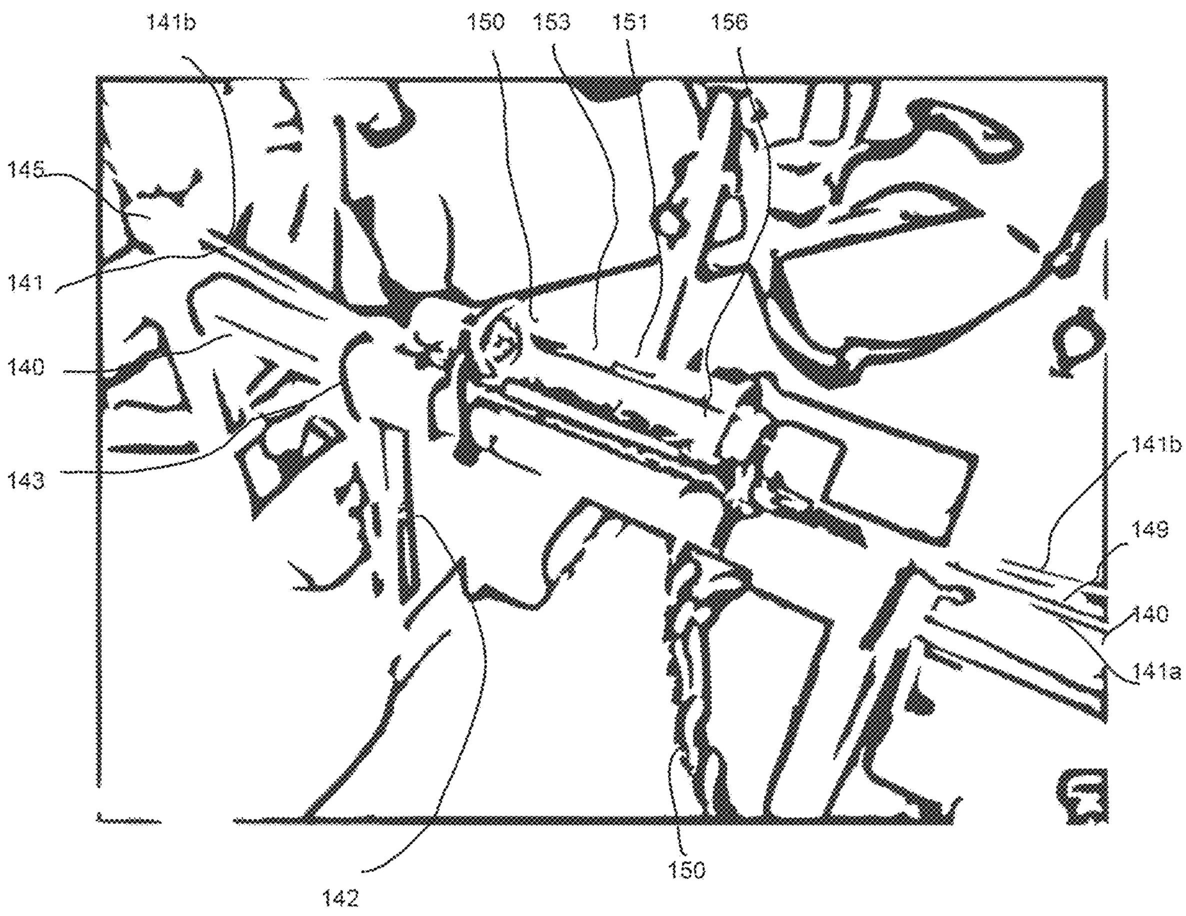
FIG. 21 illustrates a magnified top perspective view of dog restraint device of an alternative embodiment of the present invention.
Figure 22:
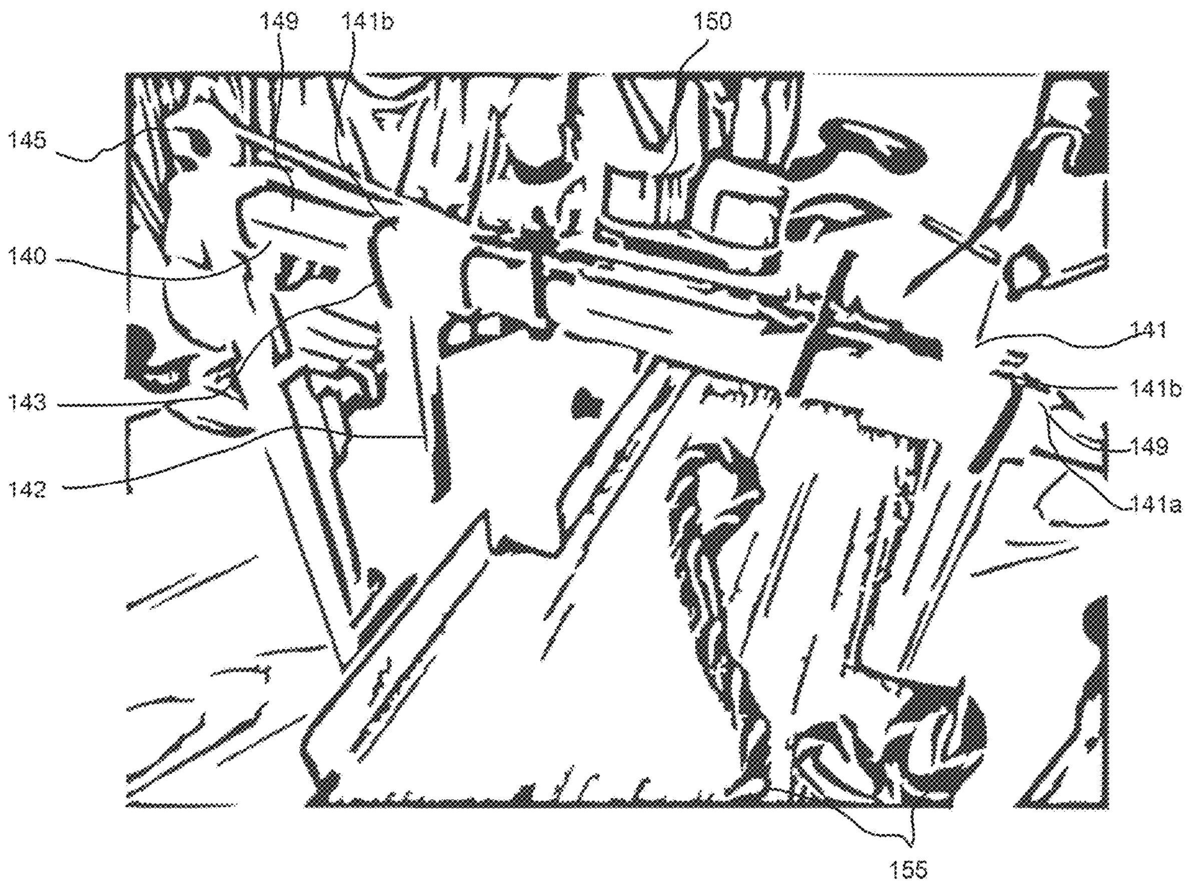
FIG. 22 illustrates a further magnified top perspective view of dog restraint device of an alternative embodiment of the present invention.
Figure 23:
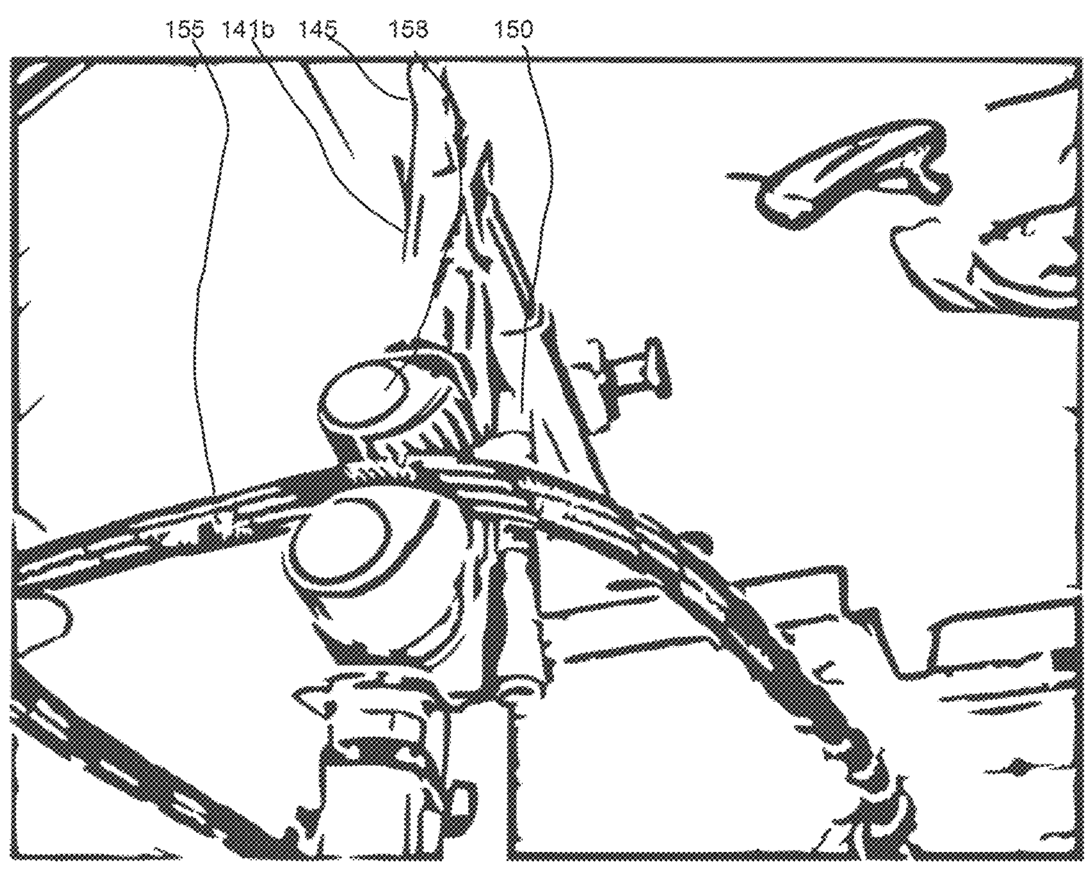
FIG. 23 illustrates a magnified top perspective view of dog restraint device of an alternative embodiment of the present invention.

A further alternative embodiment is shown in FIGS. 16-26 with the shoulder bar shown with alternative features, including a locking leash mount, and horizontally sliding and locking wings. As seen, alternative system 100 may include shoulder bar 140, with leash mount hingedly coupled to shoulder bar 140 by lowering hinge 151. Lowering hinge may be opened (as shown in FIGS. 16-17, and 20-21) to expose grip 152, a highly friction portion, often made of rubber or other pad and/or grip material. When the leash mount is closed (as shown in FIGS. 18, 19, 22, etc.), securing string 141 can be captured and secured (length) in the leash mount 150. Leash mount 150 is coupled to upper plate 153 to shoulder bar 140 via lowering hinge 151. The leash mount can be hingedly opened to allow for movement of securing string, which can then be locked in place when leash mount is closed. A pair of securing balls 156 may be set on either side of upper plate, and spring biased inward, such that when the upper plate passed, it forces the securing balls outwards and locks up or down once passing the securing balls. Alternative or additional method of securing location of wings 142 is by the use of apertures in the shoulder bar 140 and wing mount 143. Wing mount 143 may include apertures 163 that complement apertures 173 in shoulder bar 142, so that a pin (not shown) or similar elongated piece may be set through the apertures 163 and corresponding apertures 173 to secure the relative position of the wing mount. Additionally, the wing mounts each use a separate pulley and spring system to allow for the relative location of each wing mount (and thereby wing) relative the forward riser bars 170.

Figure 24:
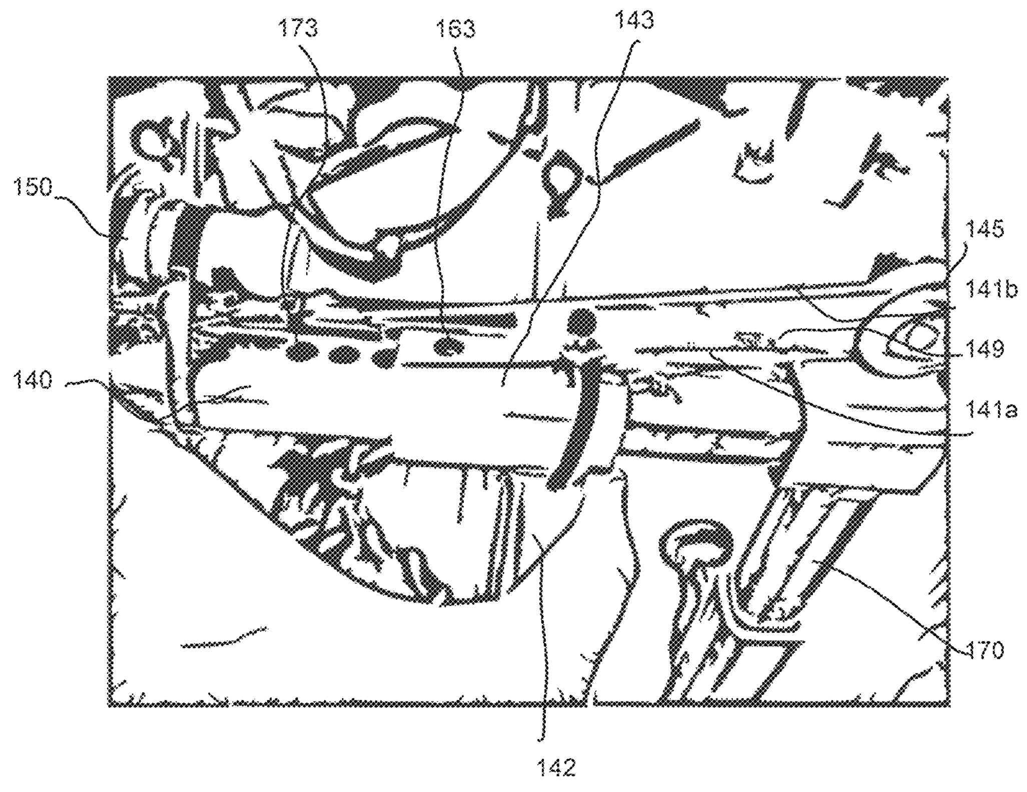
FIG. 24 illustrates a magnified top perspective view of dog restraint device of an alternative embodiment of the present invention.
Figure 25:
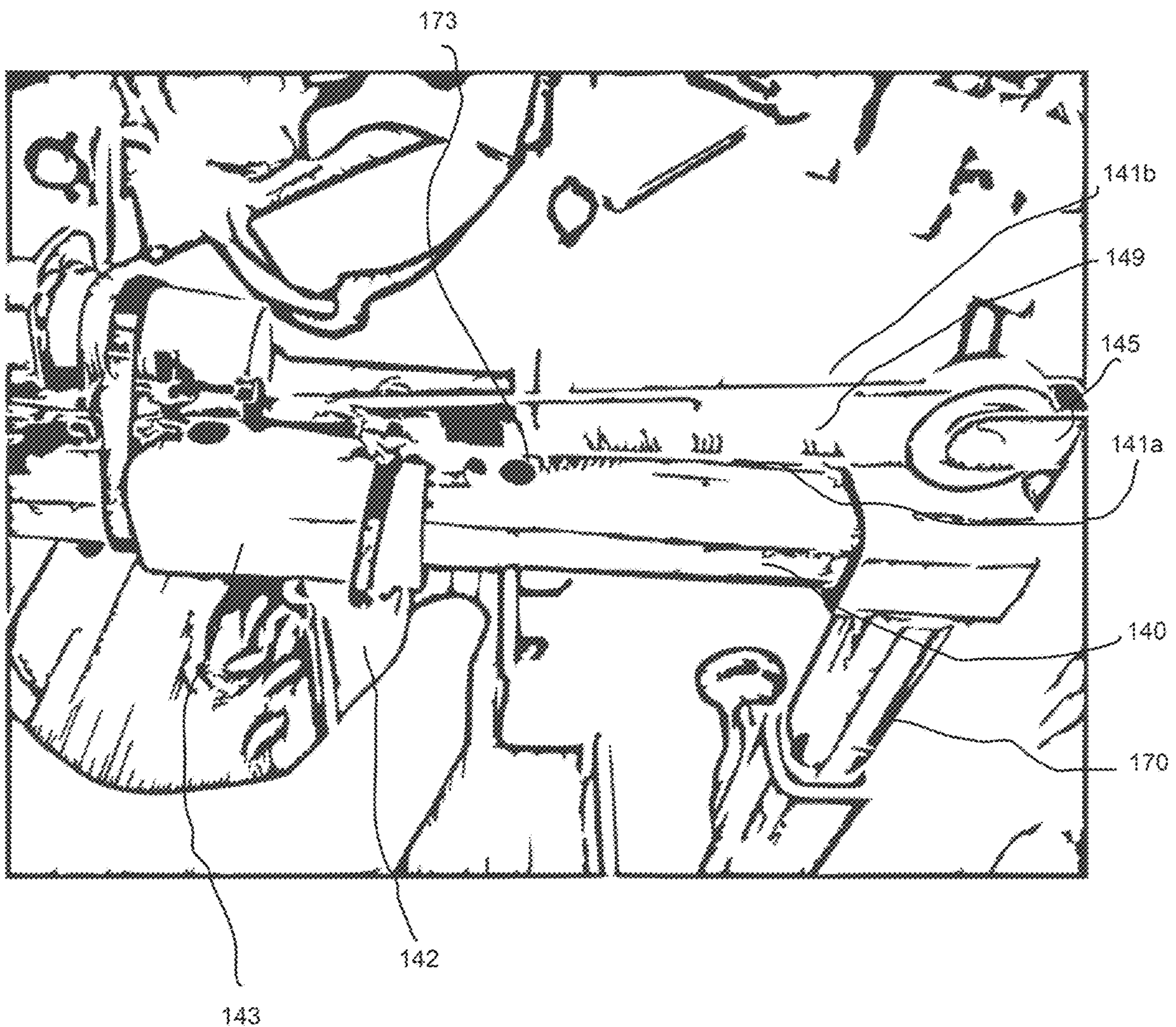
FIG. 25 illustrates a magnified top perspective view of dog restraint device of an alternative embodiment of the present invention.
Figure 26:
FIG. 26 illustrates a top perspective view of an alternative animal restraint device in collapsed form.

In this embodiment, wings 142 may simply be vertical or downward emanating columns (here shown as rectangular columns). The wings 142 may be set on wing mounts 143 which may slidably couple (circumferentially surround) shoulder bar 142. Wing mounts 143 may be coupled to securing string 141, which may be set to pulley 145 mounted at a top corner 146 of shoulder bar 140, wherein a lower section of securing string 141*a* connect to the wing 142 and/or wing mount 143 set through pulley 145 and form upper portion of securing string 141*b*, wherein a center of the securing string 141*c* can be set and locked within leash mount 150 to set the distance between the wings 142. A set of springs 149 bias the position of wings 142 outwards, so that a force is required to bring the wings closer together (while animal in place), the leash mount closed. As seen in FIGS. 24-25) the wings 142 may be pulled together to extend spring 149. Then when release of the animal is required, the leash mount may be simply opened causing the springs to draw the wings apart to give the animal freedom of lateral movement. The direction of the hinge allows the leash mount to swing to the rear, and thus complements the leash mount direction to allow some slack to the animal upon release. The leash mount biased cams 158 may then be opened to release the leash 155.

I claim:

1. An animal restraint device to restrain an animal, said device comprising:

a lower horizontal planar platform supporting one or more legs of the animal;

at least four poles coupled to said lower horizontal planar platform, including two rear poles and two forward poles;

a leash set around the animal's neck, with a distal end coupled to a leash mount on a linear horizontal shoulder bar spanning said two forward bars and set above the animal's shoulders, said leash mount coupled to the linear horizontal shoulder bar via a lowering hinge;

a first strap coupled to at least one of said two rear poles, said strap optionally coupled with the other of said two rear poles.

2. The animal restraint device as set forth in claim 1 wherein said leash mount is affixed to an upper plate hinged with said lowering hinge.

3. The animal restraint device as set forth in claim 2 wherein said leash mount is centered on said shoulder bar.

4. The animal restraint device as set forth in claim 1 wherein said shoulder bar is set horizontal further comprising a pair of wings extending downwardly from said shoulder bar on either side of a center of said shoulder bar.

5. The animal restraint device as set forth in claim 1 wherein said strap being optionally coupled to said other of said rear poles via a quick release buckle.

6. The animal restraint device as set forth in claim 5 further comprising a second strap with a first end fixedly coupled to said first strap, and a second end comprising a fastener adapted to mate and fasten with said first strap.

7. The animal restraint device as set forth in claim 6 wherein said fastener comprising a hook-and-loop fastener, and said first strap comprising a complementary portion of a hook-and-loop fastener to mate with said fastener.

8. The animal restraint device as set forth in claim 5 further comprising a tensioner coupled to said strap and optionally securing a predetermined length of strap set between said two rear poles.

9. The animal restraint device as set forth in claim 1 wherein said leash mount comprising a dual cam cleat; wherein said dual cam cleat comprises a pair of cams, each of said pair of cams comprising a narrow extending end, and wherein said narrow extending ends are oriented rearward and biased towards a center as between said pair of cams.

10. The animal restraint device as set forth in claim 1 wherein said four poles are hingedly mounted to said platform allowing rotation of each of said poles relative said platform.

11. The animal restraint device as set forth in claim 10 wherein the plane of rotation of each of said poles is parallel one another.

12. The animal restraint device as set forth in claim 10 further comprising two forward bumpers and two rear bumpers.

13. The animal restraint device as set forth in claim 12 wherein each of said two forward bumpers are hingedly coupled one of said forward bumpers, and each of said two rear bumpers are hingedly coupled one of said rear bumpers, and wherein each of said four poles is coupled to an outside surface of said bumpers.

14. The animal restraint device as set forth in claim 12 wherein each of said two forward bumpers and two rear bumpers comprises a set hole.

15. The animal restraint device as set forth in claim 14 wherein each of said four poles comprises a spring biased set pin set through each of said set holes.

16. The animal restraint device as set forth in claim 14 wherein each of said poles is set vertical and perpendicular said platform and said planar surface.

17. The animal restraint device as set forth in claim 14 wherein said rear poles are set at an acute angle relative a rear of said platform.

18. An animal restraint device to restrain an animal, said device comprising:

a lower horizontal planar platform supporting one or more legs of the animal;

at least four poles coupled to said lower horizontal planar platform, including two rear poles and two forward poles;

a leash set around the animal's neck, with a distal end coupled to a leash mount on a linear horizontal shoulder bar spanning said two forward bars and set above the animal's shoulders, said leash mount coupled to the linear horizontal shoulder bar via a lowering hinge;

a pair of wings extending downwardly from said shoulder bar on either side of a center of said shoulder bar;

at least one spring coupled to at least one of the forward poles, said at least one spring biasing a horizontal position of at least one wing of said pair of wings outward.

19. The animal restraint device as set forth in claim 18 further comprising at least second spring biasing a second horizontal position of the other of said pair of wings outward.

* * * * *